United States Patent
Moore et al.

(10) Patent No.: US 8,301,832 B1
(45) Date of Patent: Oct. 30, 2012

(54) STORAGE SYSTEM WITH GUARANTEED READ LATENCY

(75) Inventors: William H. Moore, Fremont, CA (US); Jeffrey S. Bonwick, Los Altos, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

(21) Appl. No.: 13/428,631

(22) Filed: Mar. 23, 2012

(51) Int. Cl.
    *G06F 12/00* (2006.01)
(52) U.S. Cl. ........................................... 711/103
(58) Field of Classification Search .................. None
    See application file for complete search history.

(56) References Cited

U.S. PATENT DOCUMENTS

| 7,543,100 | B2 | 6/2009 | Singhal et al. |
| 8,200,887 | B2 | 6/2012 | Bennett |

OTHER PUBLICATIONS

Kazmi, A., "PCI Express™ Basics & Applications in Communication Systems," PCI-SIG Developers Conference, 2004 (50 pages).
Percival, D., "Multicast Over PCI Express®," PCI-SIG Developer's Conference Europe, 2009 (33 pages).
Huffman, A., NVM Express Revision 1.0b, Jul. 12, 2011 (126 pages).
Regula, J., Using Non-transparent Bridging in PCI Express Systems, Jun. 1, 2004 (31 pages).

*Primary Examiner* — Brian Peugh
(74) *Attorney, Agent, or Firm* — Osha • Liang LLP

(57) ABSTRACT

A method for writing data to persistent storage. The method includes receiving a first request to write a first datum to persistent storage including NAND dies, identifying a first NAND die in which to write a first copy of the first datum and a second NAND die in which to write a second copy, generating a second request to write the first copy of the first datum to the first NAND die and a third request to write the second copy to the second NAND die, and waiting until the first NAND die and second NAND die not are busy. Based on a determination that the first NAND die and the second NAND die are not busy: issuing the second request to the first NAND die, and issuing the third request to the second NAND die after the second request is complete.

20 Claims, 19 Drawing Sheets

STORAGE SYSTEM WITH GUARANTEED READ LATENCY

BACKGROUND

The speed at which a system can write data to persistent storage and read data from persistent storage is often a critical factor in the overall performance of the system. The traditional approach to reading data from and writing data to persistent storage requires processing by multiple layers in the system kernel and by multiple entities in the hardware. As a result, reading data from and writing to persistent storage introduces significant latency in the system and, consequently, reduces the overall performance of the system.

SUMMARY

In general, in one aspect, the invention relates to a method for writing data to persistent storage. The method includes receiving a first request to write a first datum to persistent storage, wherein the persistent storage comprises a plurality of NAND dies, in response to the first request: identifying a first NAND die in which to write a first copy of the first datum, identifying a second NAND die in which to write a second copy of the first datum, generating a second request to write the first copy of the first datum to the first NAND die, generating a third request to write the second copy of the first datum to the second NAND die, waiting until the first NAND die and second NAND die not are busy, based on a determination that the first NAND die and the second NAND die are not busy: issuing the second request to the first NAND die, and issuing the third request to the second NAND die after the second request is complete.

In general, in one aspect, the invention relates to a system. The system includes a control module including an Input/Output module (IOM), a processor, a first memory connected to the processor, a switch fabric, wherein the IOM and the processor are connected to the switch fabric. The system further includes a first storage module connected to the control module using the switch fabric and comprising a second memory and a first persistent storage. The system further includes a second storage module connected to the control module using the switch fabric and comprising a third memory and a second persistent storage. The control module is configured to receive, from the control module, a first request to write a first datum to persistent storage, wherein the persistent storage comprises the first persistent storage and the second persistent storage, in response to the first request: identify a first NAND die in which to write a first copy of the first datum, wherein the first NAND die is located in the first persistent storage, identify a second NAND die in which to write a second copy of the first datum, wherein the first NAND die is located in the first persistent storage, generate a second request to write the first copy of the first datum to the first NAND die, generate a third request to write the second copy of the first datum to the second NAND die, waiting until the first NAND die and second NAND die not are busy, based on a determination that the first NAND die and the second NAND die are not busy: issue the second request to the first NAND die and issue the third request to the second NAND die after the second request is complete and both the first NAND die.

In general, in one aspect, the invention relates to a method for reading data. The method includes receiving a request to read the data, wherein the request comprises a logical address, determining a plurality of physical addresses based on the logical address, wherein a first physical address of the plurality of physical addresses comprises a first datum, wherein a second physical address of the plurality of physical addresses comprises a second datum, wherein a third physical address of the plurality of physical addresses comprises parity datum, identifying the first physical address and the second physical address, wherein the first physical address corresponds to a location on a first NAND die, the second physical address corresponds to a location on a second NAND die, the third physical address corresponds to a location on a third NAND die, wherein the first NAND die and the third NAND die are not busy and the second NAND die is busy, obtaining the first datum from the first NAND die and the parity datum from the third NAND die, reconstructing the second datum from the first datum and the parity datum, combining the first datum and the second datum to obtain the data, and returning the data to the client.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a storage system. More specifically, embodiments of the invention relate to a storage system that schedules writes to solid state storage modules such that there is always at least one copy of the data available to read. Said another way, embodiments of the invention relate to a method and system in which there are multiple copies of each piece of data and that at any given time at least one copy of the data may be immediately (or almost immediately) read from the persistent storage. Embodiments of the invention provide a mechanism to allow for a low latency read of at least one copy of the data at any given time. More specifically, when a client requests to read the data, the client will not need to wait for a write operation to complete prior to servicing the read request.

Figure 1A:
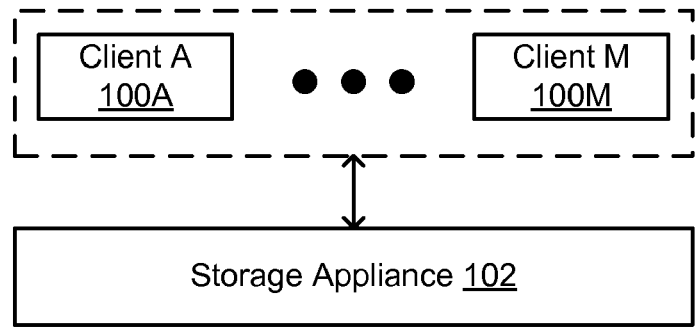
FIGS. 1A-1E show systems in accordance with one or more embodiments of the invention.

FIGS. 1A-1E show systems in accordance with one or more embodiments of the invention. Referring to FIG. 1A, the system includes one or more clients (client A (100A), client M (100M)) operatively connected to a storage appliance (102).

In one embodiment of the invention, clients (100A, 100M) correspond to any system that includes functionality to issue a read request to the storage appliance (102) and/or issue a write request to the storage appliance (102). Though not shown in FIG. 1A, each of the clients (100A, 100M) may include a client processor and client memory. Additional details about components in a client are described in FIG. 1D below. In one embodiment of the invention, the clients (100A, 100M) are configured to communicate with the storage appliance (102) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the invention is not limited to the aforementioned protocols.

In one or more embodiments of the invention, if the client implements PCI, PCI-express, or NVMe, then the client includes a root complex (not shown). In one embodiment of the invention, the root complex is a device that connects the client processor and client memory to the PCIe Fabric. In one embodiment of the invention, the root complex is integrated into the client processor.

Figure 1B:
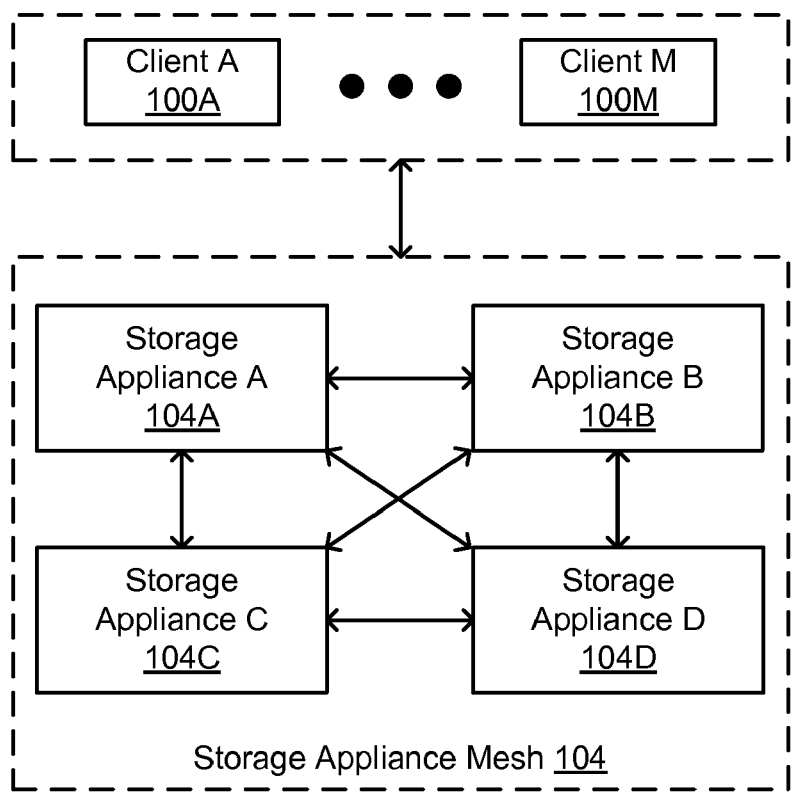
Figure 1C:
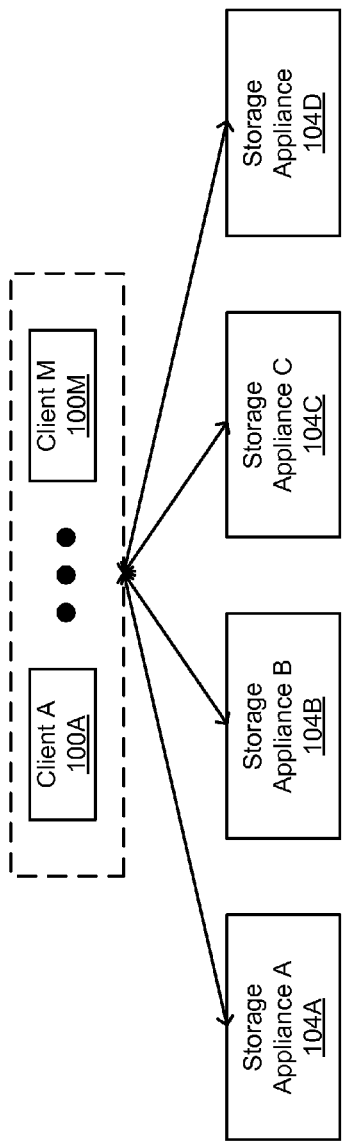
Figure 1D:
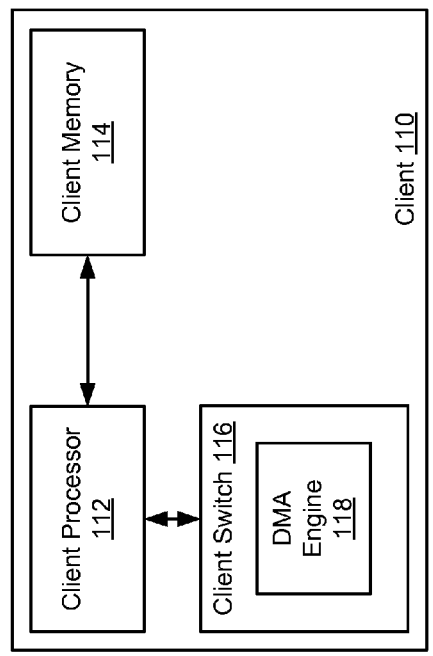
Figure 2A:
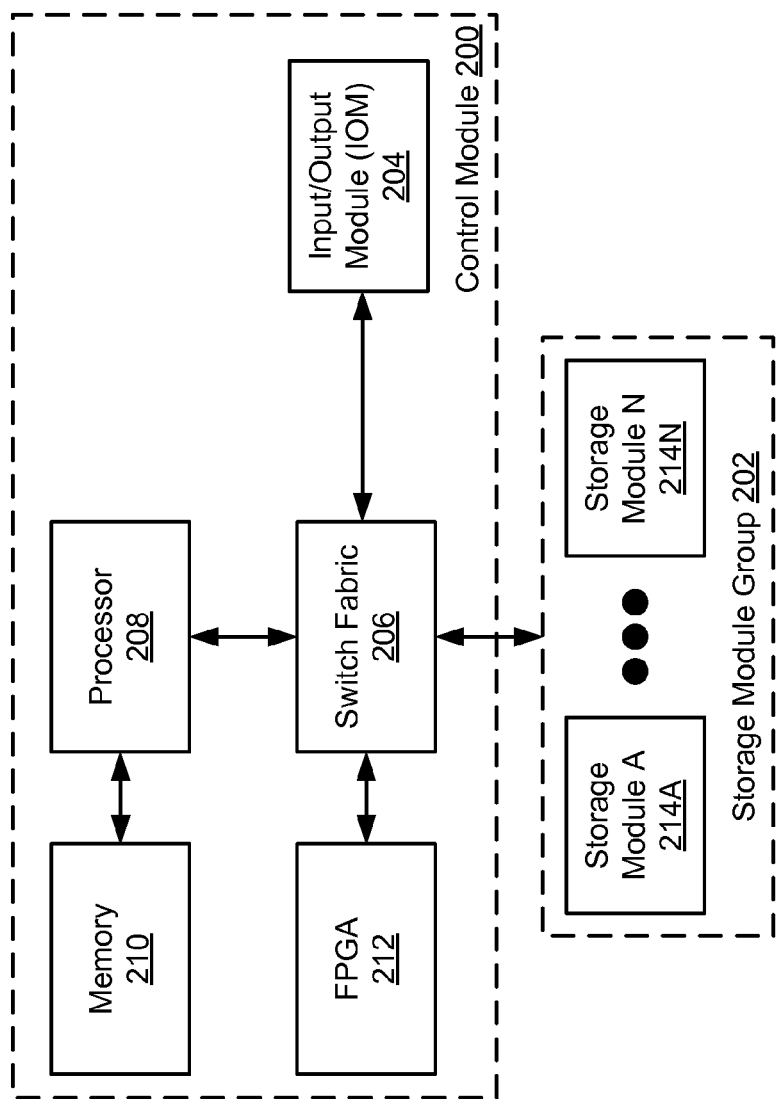
FIGS. 2A-2D show storage appliances in accordance with one or more embodiments of the invention.

In one embodiment of the invention, the PCIe Fabric includes root complexes and endpoints which are connected via switches (e.g., client switch (116) in FIG. 1D and switches within the switch fabric, e.g., switch fabric (206) in FIG. 2A). In one embodiment of the invention, an endpoint is a device other than a root complex or a switch that can originate PCI transactions (e.g., read request, write request) or that is a target of PCI transactions.

In one embodiment of the invention, a single client and a single storage appliance may be considered part of a single PCIe Fabric. In another embodiment of the invention, any combination of one or more clients and one or more storage appliances may be considered part of a single PCIe Fabric. Further, if the individual components within the storage appliance communicate using PCIe, and individual components in the client (see FIG. 1D) communicate using PCIe, then all the components in the storage appliance and the client may be considered part of a single PCIe Fabric. Those skilled in the art will appreciate that various embodiments of the invention may be implemented using another type of fabric without departing from the invention.

Continuing with FIG. 1A, in one embodiment of the invention, the storage appliance (102) is a system that includes volatile and persistent storage and is configured to service read requests and/or write requests from one or more clients (100A, 100M). Various embodiments of the storage appliance (102) are described below in FIGS. 2A-2D.

Referring to FIG. 1B, FIG. 1B shows a system in which clients (100A, 100M) are connected to multiple storage appliances (104A, 104B, 104C, 104D) arranged in a mesh configuration (denoted as storage appliance mesh (104) in FIG. 1B). As shown in FIG. 1B, the storage appliance mesh (104) is shown in a fully-connected mesh configuration—that is, every storage appliance (104A, 104B, 104C, 104D) in the storage appliance mesh (104) is directly connected to every other storage appliance (104A, 104B, 104C, 104D) in the storage appliance mesh (104). In one embodiment of the invention, each of the clients (100A, 100M) may be directly connected to one or more storage appliances (104A, 104B, 104C, 104D) in the storage appliance mesh (104). Those skilled in the art will appreciate that the storage appliance mesh may be implemented using other mesh configurations (e.g., partially connected mesh) without departing from the invention.

Referring to FIG. 1C, FIG. 1C shows a system in which clients (100A, 100M) are connected to multiple storage appliances (104A, 104B, 104C, 104D) arranged in a fan-out configuration. In this configuration, each client (100A, 100M) is connected to one or more of the storage appliances (104A, 104B, 104C, 104D); however, there is no communication between the individual storage appliances (104A, 104B, 104C, 104D).

Referring to FIG. 1D, FIG. 1D shows a client in accordance with one or more embodiments of the invention. As shown in FIG. 1D, the client (110) includes a client processor (112), client memory (114), and a client switch (116). Each of these components is described below.

In one embodiment of the invention, the client processor (112) is a group of electronic circuits with a single core or multiple cores that are configured to execute instructions. In one embodiment of the invention, the client processor (112) may be implemented using a Complex Instruction Set (CISC) Architecture or a Reduced Instruction Set (RISC) Architecture. In one or more embodiments of the invention, the client processor (112) includes a root complex (as defined by the PCIe protocol) (not shown). In one embodiment of the invention, if the client (110) includes a root complex (which may be integrated into the client processor (112)) then the client memory (114) is connected to the client processor (112) via the root complex. Alternatively, the client memory (114) is directly connected to the client processor (112) using another point-to-point connection mechanism. In one embodiment of the invention, the client memory (114) corresponds to any volatile memory including, but not limited to, Dynamic Random-Access Memory (DRAM), Synchronous DRAM, SDR SDRAM, and DDR SDRAM.

In one embodiment of the invention, the client memory (114) includes one or more of the following: a submission queue for the client processor and a completion queue for the client processor. In one embodiment of the invention, the storage appliance memory includes one or more submission queues for client processors visible to a client through the fabric, and the client memory includes one or more completion queues for the client processor visible to the storage appliance through the fabric. In one embodiment of the invention, the submission queue for the client processor is used to send commands (e.g., read request, write request) to the client processor. In one embodiment of the invention, the completion queue for the client processor is used to signal the client processor that a command it issued to another entity has been completed. Embodiments of the invention may be implemented using other notification mechanisms without departing from the invention.

In one embodiment of the invention, the client switch (116) includes only a single switch. In another embodiment of the invention, the client switch (116) includes multiple interconnected switches. If the client switch (116) includes multiple switches, each switch may be connected to every other switch, may be connected to a subset of the switches in the switch fabric, or may only be connected to one other switch. In one embodiment of the invention, each of the switches in the client switch (116) is a combination of hardware and logic (implemented, for example, using integrated circuits) (as defined by the protocol(s) the switch fabric implements) that is configured to permit data and messages to be transferred between the client (110) and the storage appliances (not shown).

In one embodiment of the invention, when the clients (100A, 100M) implement one or more of the following protocols PCI, PCIe, or PCI-X, the client switch (116) is a PCI switch.

In such embodiments, the client switch (116) includes a number of ports, where each port may be configured as a transparent bridge or a non-transparent bridge. Ports implemented as transparent bridges allow the root complex to continue discovery of devices (which may be other root complexes, switches, PCI bridges, or endpoints) connected (directly or indirectly) to the port. In contrast, when a root complex encounters a port implemented as a non-transparent bridge, the root complex is not able to continue discovery of devices connected to the port—rather, the root complex treats such a port as an endpoint.

When a port is implemented as a non-transparent bridge, devices on either side of the non-transparent bridge may only communicate using a mailbox system and doorbell interrupts (implemented by the client switch). The doorbell interrupts allow a processor on one side of the non-transparent bridge to issue an interrupt to a processor on the other side of the non-transparent bridge. Further, the mailbox system includes one or more registers that are readable and writeable by processors on either side of the switch fabric. The aforementioned registers enable processors on either side of the client switch to pass control and status information across the non-transparent bridge.

In one embodiment of the invention, in order to send a PCI transaction from a device on one side of the non-transparent bridge to a device on the other side of the non-transparent bridge, the PCI transaction must be addressed to the port implementing the non-transparent bridge. Upon receipt of the PCI transaction, the client switch performs an address translation (either using a direct address translation mechanism or a look-up table based translation mechanism). The resulting address is then used to route the packet towards the appropriate device on the other side of the non-transparent bridge.

In one embodiment of the invention, the client switch (116) is configured such that at least a portion of the client memory (114) is directly accessible to the storage appliance. Said another way, a storage appliance on one side of the client switch may directly access, via the client switch, client memory on the other side of the client switch.

In one embodiment of the invention, the client switch (116) includes a DMA engine (118). In one embodiment of the invention, the DMA engine (118) may be programmed by either the client processor or a storage appliance connected to the client switch. As discussed above, the client switch (116) is configured such that at least a portion of the client memory (114) is accessible to the storage appliance or storage modules. Accordingly, the DMA engine (118) may be programmed to read data from an address in the portion of the client memory that is accessible to the storage appliance and directly write a copy of such data to memory in the storage appliance or storage modules. Further, the DMA engine (118) may be programmed to read data from the storage appliance and directly write a copy of such data to an address in the portion of the client memory that is accessible to the storage appliance.

In one embodiment of the invention, the DMA engine (118) supports multicasting. In such embodiments, a processor in the storage appliance (see FIG. 2A) may create a multicast group, where each member of the multicast group corresponds to a unique destination address in memory on the storage appliance. Each member of the multicast group is associated with a descriptor that specifies: (i) the destination address; (ii) the source address; (iii) the transfer size field; and (iv) a control field. The source address for each of the descriptors remains constant while the destination address changes for each descriptor. Once the multicast group is created, any data transfer through the switch targeting the multicast group address, including a transfer initiated by a DMA engine, places an identical copy of the data in all of the destination ports associated with the multicast group. In one embodiment of the invention, the switch processes all of the multicast group descriptors in parallel.

Continuing with the discussion of FIG. 1D, those skilled in the art will appreciate that while FIG. 1D shows a client switch (116) located in the client (110), the client switch (116) may be located external to the client without departing from the invention. Further, those skilled in the art will appreciate that the DMA engine (118) may be located external to the client switch (116) without departing from the invention.

Figure 1E:
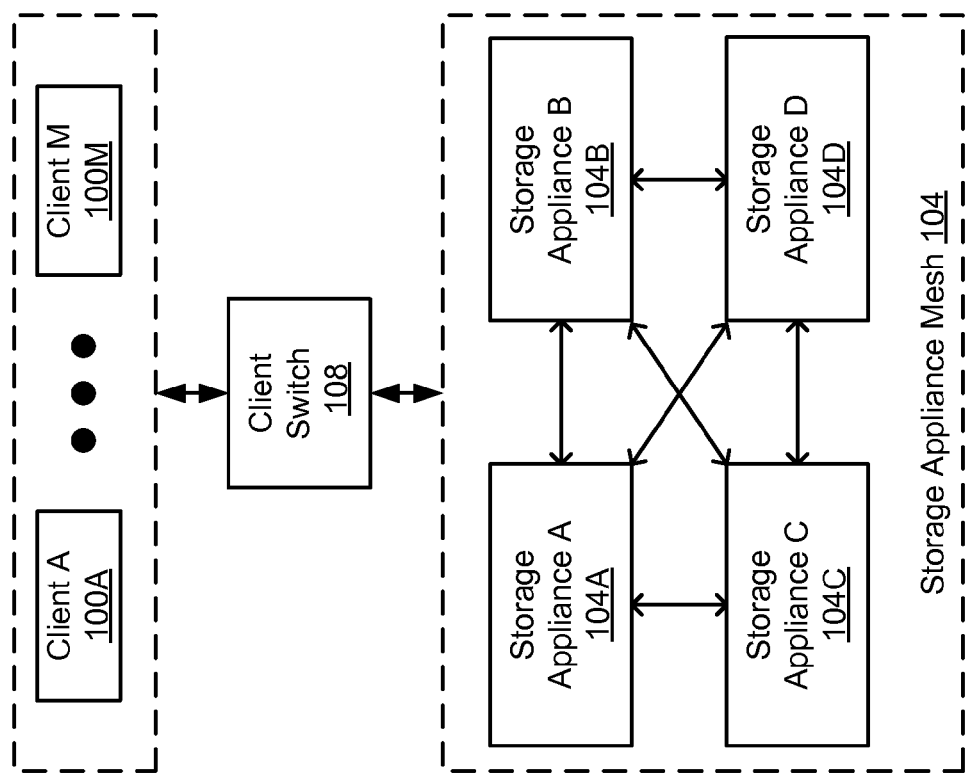

Referring FIG. 1E, FIG. 1E shows a system in which clients (100A, 100M) are connected, via a client switch (108), to multiple storage appliances (104A, 104B, 104C, 104D) arranged in a mesh configuration (denoted as storage appliance mesh (104) in FIG. 1E). In the embodiment shown in FIG. 1E, each client (100A, 100M) does not include its own client switch—rather, all of the clients share a client switch (108). As shown in FIG. 1E, the storage appliance mesh (104) is shown in a fully-connected mesh configuration—that is, every storage appliance (104A, 104B, 104C, 104D) in the storage appliance mesh (104) is directly connected to every other storage appliance (104A, 104B, 104C, 104D) in the storage appliance mesh (104). In one embodiment of the invention, the client switch (108) may be directly connected to one or more storage appliances (104A, 104B, 104C, 104D) in the storage appliance mesh (104). Those skilled in the art will appreciate that storage appliance mesh may be implemented using other mesh configurations (e.g., partially connected mesh) without departing from the invention.

Though not shown in FIG. 1E, each client may include its own client switch (as shown in FIG. 1D) but may be connected to the storage appliance mesh (104) using a switch fabric (defined below).

Those skilled in the art will appreciate that while FIGS. 1A-1E show storage appliances connected to a limited number of clients, the storage appliances may be connected to any number of clients without departing from the invention. Those skilled in the art will appreciate that while FIGS. 1A-1E show various system configurations, the invention is not limited to the aforementioned system configurations. Further, those skilled in the art will appreciate that the clients (regardless of the configuration of the system) may be connected to the storage appliance(s) using a switch fabric (not shown) (described below) without departing from the invention.

FIGS. 2A-2D show embodiments of storage appliances in accordance with one or more embodiments of the invention.

Referring to FIG. 2A, the storage appliance includes a control module (200) and a storage module group (202). Each of these components is described below. In general, the control module (200) is configured to manage the servicing of read and write requests from one or more clients. In particular, the control module is configured to receive requests from one or more clients via the IOM (discussed below), to process the request (which may include sending the request to the storage module), and to provide a response to the client after the request has been serviced. Additional details about the components in the control module are included below. Further, the operation of the control module with respect to servicing read and write requests is described below with reference to FIGS. 4A-7C.

Continuing with the discussion of FIG. 2A, in one embodiment of the invention, the control module (200) includes an Input/Output Module (IOM) (204), a switch fabric (206), a processor (208), a memory (210), and, optionally, a Field Programmable Gate Array (FPGA) (212). In one embodiment of the invention, the IOM (204) is the physical interface between the clients (100A, 100M in FIGS. 1A-1E) and the other components in the storage appliance. The IOM supports one or more of the following protocols: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE). Those skilled in the art will appreciate that the IOM may be implemented using protocols other than those listed above without departing from the invention.

Continuing with the discussion of FIG. 2A, the switch fabric (206) includes only a single switch. In another embodiment of the invention, the switch fabric (206) includes multiple interconnected switches. If the switch fabric (206) includes multiple switches, each switch may be connected to every other switch, may be connected to a subset of switches in the switch fabric, or may only be connected to one other switch in the switch fabric. In one embodiment of the invention, each of the switches in the switch fabric (206) is a combination of hardware and logic (implemented, for example, using integrated circuits) (as defined by the protocol(s) the switch fabric implements) that is configured to connect various components together in the storage appliance and to route packets (using the logic) between the various connected components. In one embodiment of the invention, the switch fabric (206) is physically connected to the IOM (204), processor (208), storage module group (202), and, if present, the FPGA (212). In one embodiment of the invention, all inter-component communication in the control module (200) (except between the processor (208) and memory (210)) passes through the switch fabric (206). Further, all communication between the control module (200) and the storage module group (202) passes through the switch fabric (206). In one embodiment of the invention, the switch fabric (206) is implemented using a PCI protocol (e.g., PCI, PCIe, PCI-X, or another PCI protocol). In such embodiments, all communication that passes through the switch fabric (206) uses the corresponding PCI protocol.

In one embodiment of the invention, if the switch fabric implements a PCI protocol, the switch fabric (206) includes a port for the processor (or, more specifically, a port for the root complex integrated in the processor (208) or for the root complex connected to the processor), one or more ports for storage modules (214A, 214N) (see FIG. 3) in the storage module group (202), a port for the FPGA (212) (if present), and a port for the IOM (204). In one or more embodiments of the invention, each of the aforementioned ports may be configured as a transparent bridge or a non-transparent bridge (as discussed above). Those skilled in the art will appreciate that while the switch fabric (206) has been described with respect to a PCI implementation, the switch fabric (206) may be implemented using other protocols without departing from the invention.

In one embodiment of the invention, at least one switch in the switch fabric (206) is configured to implement multicasting. More specifically, in one embodiment of the invention, the processor (208) is configured to generate a multicast group where the multicast group includes two or more member with each member specifying an address in the memory (210) and/or in the storage modules (214A, 214N). When the multicast group is created, the multicast group is associated with a multicast address. In order to implement the multicasting, at least one switch in the switch fabric is configured that when a write specifying the multicast address as the destination address is received, the switch is configured to generate a new write for each member in the multicast group and issue the writes to the appropriate address in the storage appliance. In one embodiment of the invention, the address for each write generated by the switch is determined by adding a particular offset to the multicast address.

Continuing with FIG. 2A, the processor (208) is a group of electronic circuits with a single core or multi-cores that are configured to execute instructions. In one embodiment of the invention, the processor (208) may be implemented using a Complex Instruction Set (CISC) Architecture or a Reduced Instruction Set (RISC) Architecture. In one or more embodiments of the invention, the processor (208) includes a root complex (as defined by the PCIe protocol). In one embodiment of the invention, if the control module (200) includes a root complex (which may be integrated into the processor (208)) then the memory (210) is connected to the processor (208) via the root complex. Alternatively, the memory (210) is directly connected to the processor (208) using another point-to-point connection mechanism. In one embodiment of the invention, the memory (210) corresponds to any volatile memory including, but not limited to, Dynamic Random-Access Memory (DRAM), Synchronous DRAM, SDR SDRAM, and DDR SDRAM.

In one embodiment of the invention, the processor (208) is configured to create and update an in-memory data structure (not shown), where the in-memory data structure is stored in the memory (210). In one embodiment of the invention, the in-memory data structure includes mappings (direct or indirect) between logical addresses and physical storage addresses in the set of storage modules. In one embodiment of the invention, the logical address is an address at which the data appears to reside from the perspective of the client. In one embodiment of the invention, the logical address is (or includes) a hash value generated by applying a hash function (e.g. SHA-1, MD-5, etc.) to an n-tuple. In one embodiment of the invention, the n-tuple is <object ID, offset>, where the object ID defines a file and the offset defines a location relative to the starting address of the file. In another embodiment of the invention, the n-tuple is <object ID, offset, birth time>, where the birth time corresponds to the time when the file (identified using the object ID) was created. Alternatively, the logical address may include a logical object ID and a logical byte address, or a logical object ID and a logical address offset. In another embodiment of the invention, the logical address includes an object ID and an offset. Those skilled in the art will appreciate that multiple logical addresses may be mapped to a single physical address and that the logical address is not limited to the above embodiments.

Figure 3:
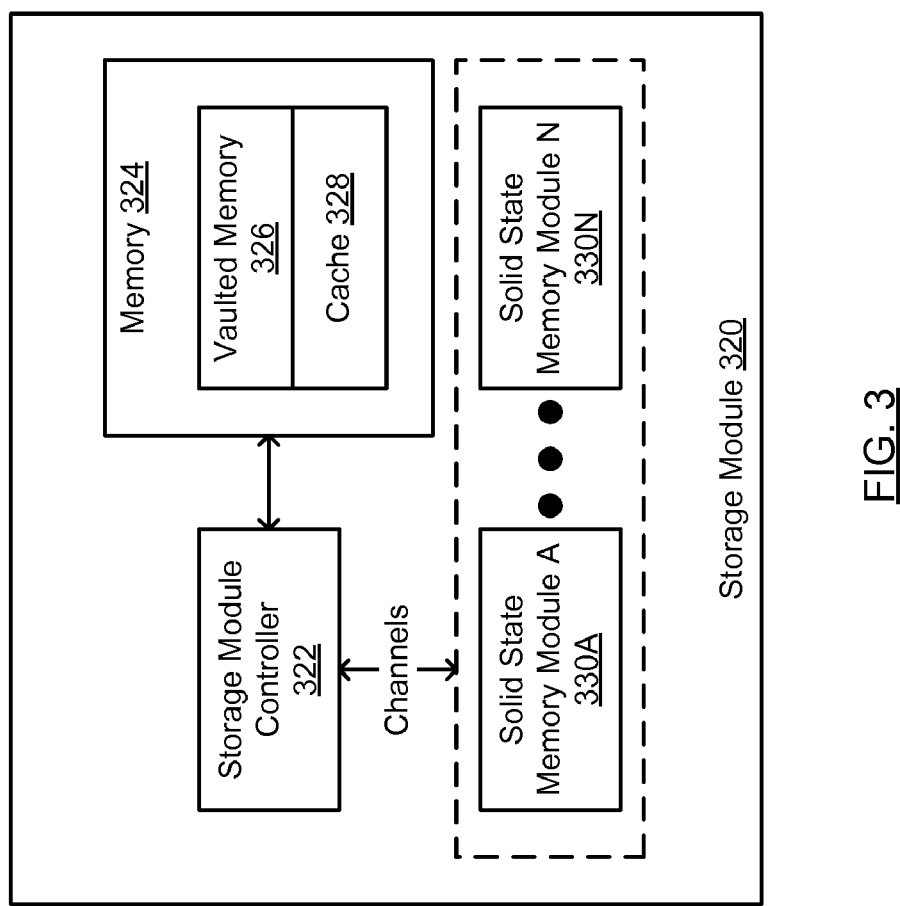
FIG. 3 shows a storage module in accordance with one or more embodiments of the invention.

In one embodiment of the invention, the physical address may correspond to (i) a location in the memory (210), (ii) a location in the vaulted memory (e.g., 324 in FIG. 3), or (iii) a location in a solid state memory module (e.g., 330A in FIG. 3). In one embodiment of the invention, the in-memory data structure may map a single hash value to multiple physical addresses if there are multiple copies of the data in the storage appliance.

In one embodiment of the invention, the memory (210) includes one or more of the following: a submission queue for the processor, a completion queue for the processor, a submission queue for each of the storage modules in the storage appliance and a completion queue for each of the storage modules in the storage appliance. In one embodiment of the invention, the submission queue for the processor is used to send commands (e.g., read request, write request) to the processor. In one embodiment of the invention, the completion queue for the processor is used to signal the processor that a command it issued to another entity has been completed. The submission and completion queues for the storage modules function in a similar manner.

In one embodiment of the invention, the processor (via the switch fabric) is configured to offload various types of processing to the FPGA (212). In one embodiment of the invention, the FPGA (212) includes functionality to calculate checksums for data that is being written to the storage module(s) and/or data that is being read from the storage module(s). Further, the FPGA (212) may include functionality to calculate P and/or Q parity information for purposes of storing data in the storage module(s) using a RAID scheme (e.g., RAID 2-RAID 6) and/or functionality to perform various calculations necessary to recover corrupted data stored using a RAID scheme (e.g., RAID 2-RAID 6). In one embodiment of the invention, the storage module group (202) includes one or more storage modules (214A, 214N) each configured to store data. Storage modules are described below in FIG. 3.

In one embodiment of the invention, the processor (208) is configured to program one or more DMA engines in the system. For example, the processor (208) is configured to program the DMA engine in the client switch (see FIG. 1D). The processor (208) may also be configured to program the DMA engine in the storage module (see FIG. 3). In one embodiment of the invention, programming the DMA engine in the client switch may include creating a multicast group and generating descriptors for each of the members in the multicast group.

Figure 2B:
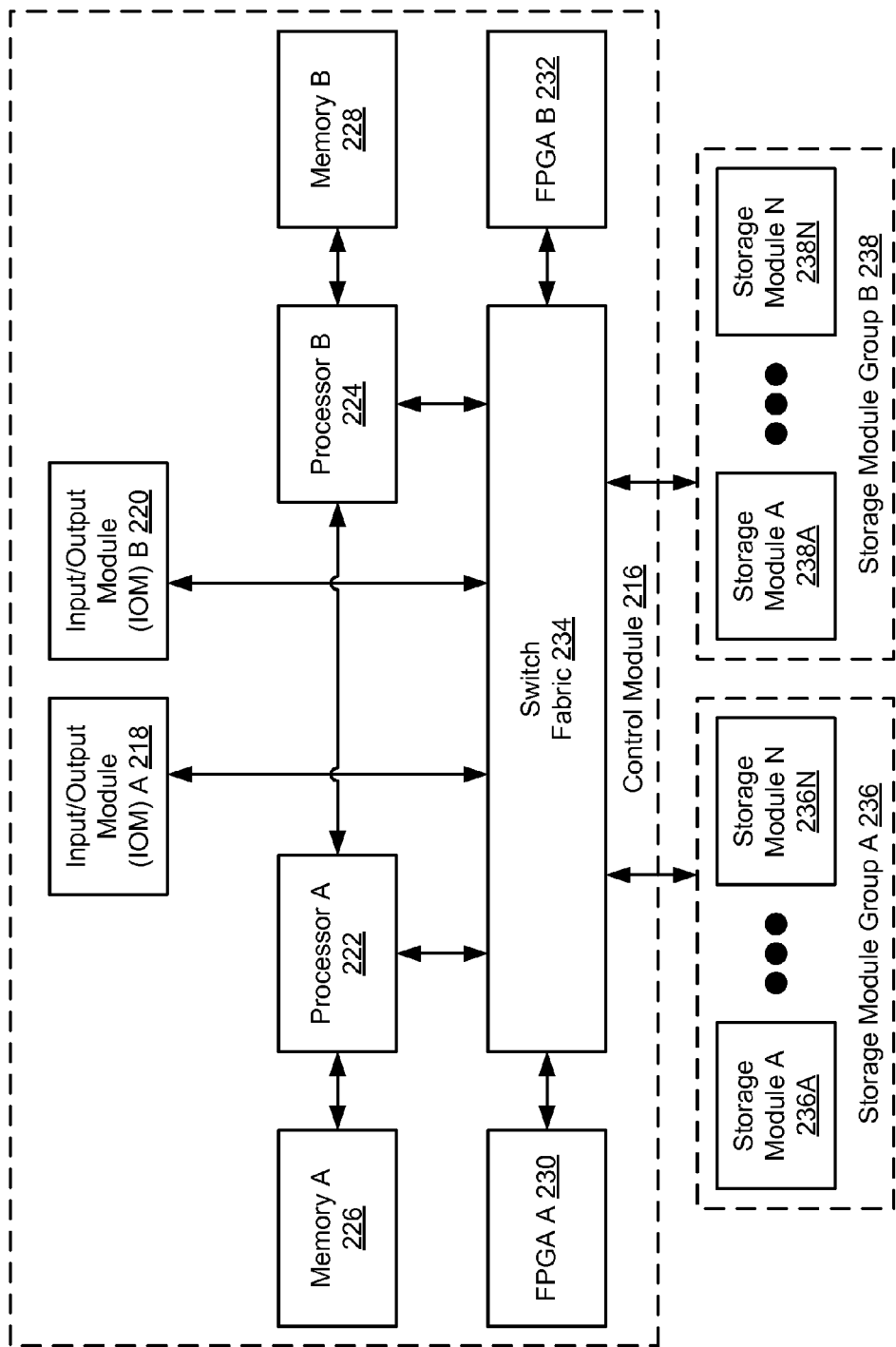

Turning to FIG. 2B, FIG. 2B shows a storage appliance in accordance with one or more embodiments of the invention. The storage appliance includes a control module (216) and at least two storage module groups (236, 238). The control module (216) includes a switch fabric (234), which is directly connected to IOM A (218), IOM B (220), processor A (222), processor B (224), (if present) FPGA A (230), (if present) FPGA B (232), storage modules (236A, 236N) in storage module group A (236) and storage modules (238A, 238N) in storage module group B (238). All communication between the aforementioned components (except between processor A (222) and processor B (224)) passes through the switch fabric (234). In one embodiment of the invention, processors (222, 224) within the control module (216) are able to directly communicate using, for example, point-to-point interconnect such as Intel® QuickPath Interconnect. Those skilled in the art will appreciate that other point-to-point communication mechanisms may be used to permit direct communication between the processor (222, 224) without departing from the invention.

Continuing with FIG. 2B, in one embodiment of the invention, the control module (216) is substantially similar to the control module (200) in FIG. 2A. In one embodiment of the invention, the switch fabric (234) is substantially similar to the switch fabric (206) in FIG. 2A. In one embodiment of the invention, each processor (222, 224) is substantially similar to the processor (208) in FIG. 2A. In one embodiment of the invention, the memory (226, 228) is substantially similar to the memory (210) in FIG. 2A. In one embodiment of the invention, the IOMs (218, 220) are substantially similar to the IOM (204) in FIG. 2A. In one embodiment of the invention, the FPGAs (230, 232) are substantially similar to the FPGA (212) in FIG. 2A. Finally, the storage module groups (236, 238) are substantially similar to the storage module group (202) in FIG. 2A.

In one embodiment of the invention, the two IOMs (218, 220) in the control module (216) double the I/O bandwidth for the control module (216) (over the I/O bandwidth of a control module with a single IOM). Moreover, the addition of a second IOM (or additional IOMs) increases the number of clients that may be connected to a given control module and, by extension, the number of clients that can be connected to a storage appliance. In one embodiment of the invention, the use of the switch fabric (234) to handle communication between the various connected components (described above) allows each of the processors (222, 224) to directly access (via the switch fabric (234)) all FPGAs (230, 232) and all storage modules (236A, 236N, 238A, 238N) connected to the switch fabric (234).

Figure 2C:
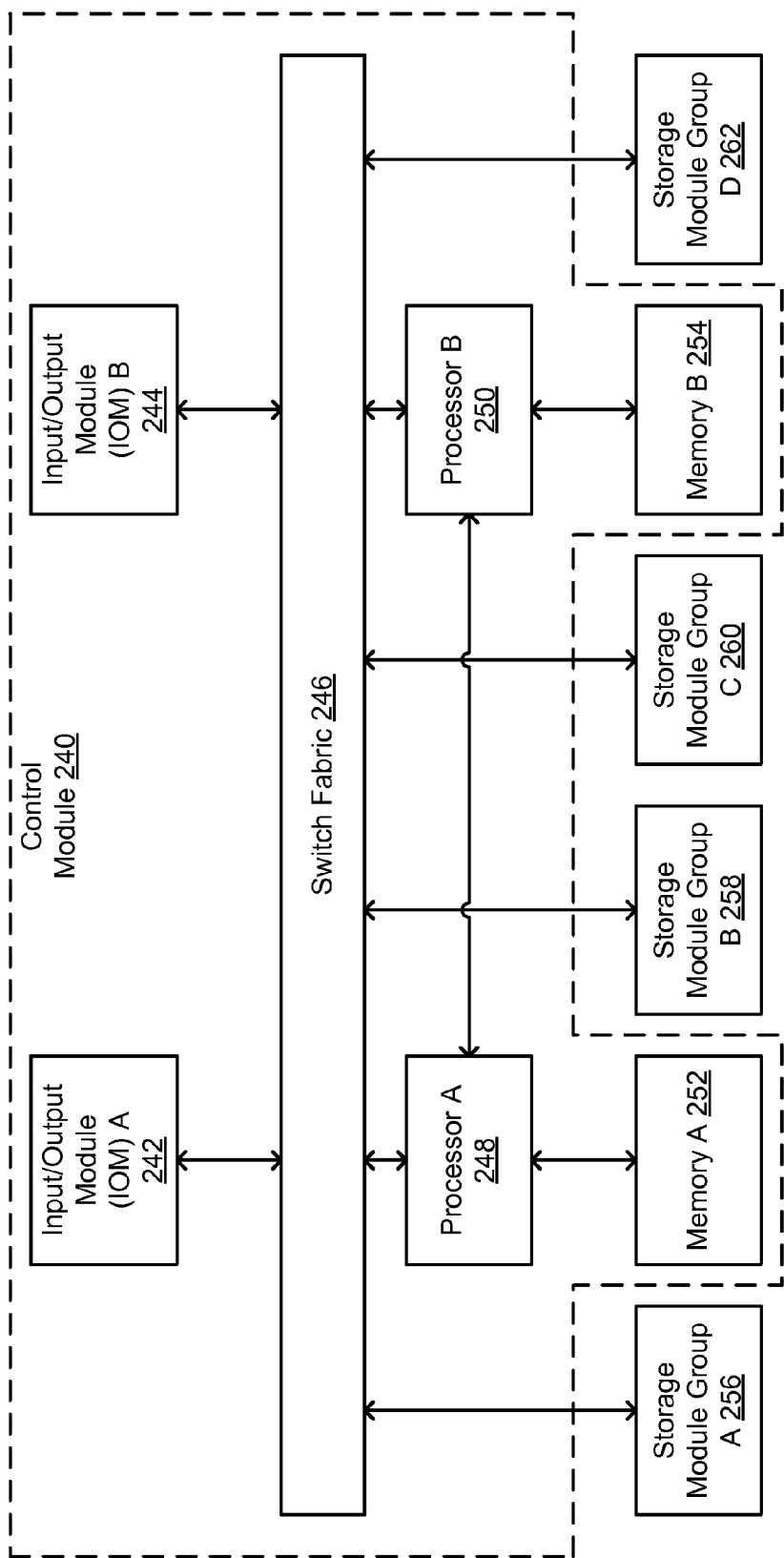

Referring to FIG. 2C, FIG. 2C shows a storage appliance that includes a control module (240) connected (via a switch fabric (246)) to multiple storage modules (not shown) in the storage module groups (256, 258, 260, 262). As shown in FIG. 2C, the control module (240) includes two IOMs (242, 244), two processors (248, 250), and memory (252, 254). In one embodiment of the invention, all components in the control module (240) communicate via the switch fabric (246). In addition, the processors (248, 250) may communicate with each other using the switch fabric (246) or a direct connection (as shown in FIG. 2C). In one embodiment of the invention, the processors (248, 250) within the control module (240) are able to directly communicate using, for example, a point-to-point interconnect such as Intel® QuickPath Interconnect. Those skilled in the art will appreciate that other point-to-point communication mechanisms may be used to permit direct communication between the processors (248, 250) without departing from the invention.

In one embodiment of the invention, processor A (248) is configured to primarily handle requests related to the storage and retrieval of data from storage module groups A and B (256, 258) while processor B (250) is configured to primarily handle requests related to the storage and retrieval of data from storage module groups C and D (260, 262). However, the processors (248, 250) are configured to communicate (via the switch fabric (246)) with all of the storage module groups (256, 258, 260, 262). This configuration enables the control module (240) to spread the processing of I/O requests between the processors and/or provides built-in redundancy to handle the scenario in which one of the processors fails.

Continuing with FIG. 2C, in one embodiment of the invention, the control module (240) is substantially similar to the control module (200) in FIG. 2A. In one embodiment of the invention, the switch fabric (246) is substantially similar to the switch fabric (206) in FIG. 2A. In one embodiment of the invention, each processor (248, 250) is substantially similar to the processor (208) in FIG. 2A. In one embodiment of the invention, the memory (252, 254) is substantially similar to the memory (210) in FIG. 2A. In one embodiment of the invention, the IOMs (242, 244) are substantially similar to the IOM (204) in FIG. 2A. Finally, the storage module groups (256, 258, 260, 262) are substantially similar to the storage module group (202) in FIG. 2A.

Figure 2D:
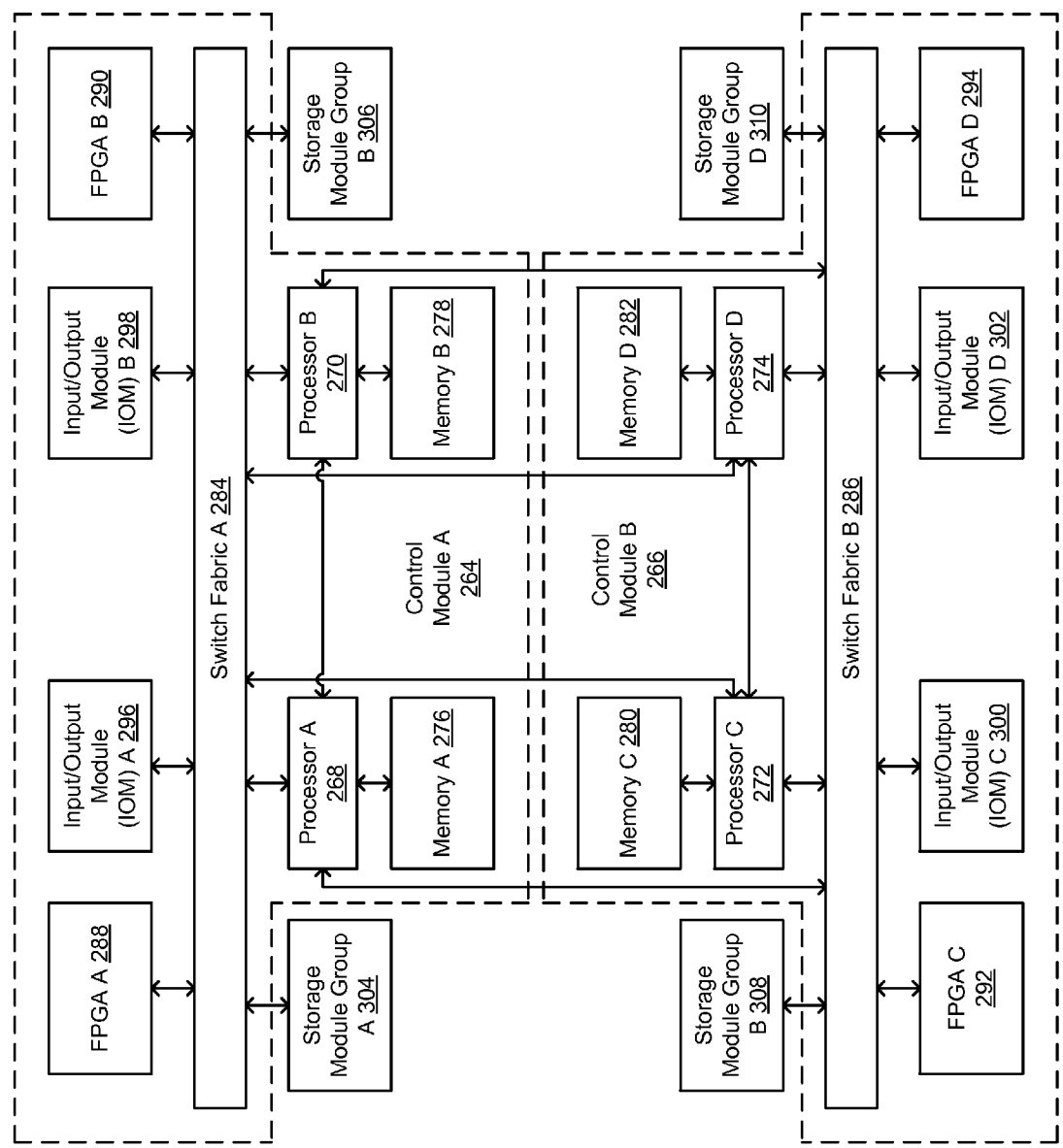

Referring to FIG. 2D, FIG. 2D shows a storage appliance that includes two control modules (264, 266). Each control module includes IOMs (296, 298, 300, 302), processors (268, 270, 272, 274), memory (276, 278, 280, 282), and FPGAs (if present) (288, 290, 292, 294). Each of the control modules (264, 266) includes a switch fabric (284, 286) through which components within the control modules communicate.

In one embodiment of the invention, processors (268, 270, 272, 274) within a control module may directly communicate with each other using, for example, a point-to-point interconnect such as Intel® QuickPath Interconnect. Those skilled in the art will appreciate that other point-to-point communication mechanisms may be used to permit direct communication between the processors (268, 270, 272, 274) without departing from the invention. In addition, processors (268, 270) in control module A may communicate with components in control module B via a direct connection to the switch fabric (286) in control module B. Similarly, processors (272, 274) in control module B may communicate with components in control module A via a direct connection to the switch fabric (284) in control module A.

In one embodiment of the invention, each of the control modules is connected to various storage modules (denoted by storage module groups (304, 306, 308, 310)). As shown in FIG. 2D, each control module may communicate with storage modules connected to the switch fabric in the control module. Further, processors in control module A (264) may communicate with storage modules connected to control module B (266) using switch fabric B (286). Similarly, processors in control module B (266) may communicate with storage modules connected to control module A (264) using switch fabric A (284).

The interconnection between the control modules allows the storage control to distribute I/O load across the storage appliance regardless of which control module receives the I/O request. Further, the interconnection of control modules enables the storage appliance to process a larger number of I/O requests. Moreover, the interconnection of control modules provides built-in redundancy in the event that a control module (or one or more components therein) fails.

With respect to FIGS. 2B-2D, in one or more embodiments of the invention, the in-memory data structure is mirrored across the memories in the control modules. In such cases, the processors in the control modules issue the necessary commands to update all memories within the storage appliance such that the in-memory data structure is mirrored across all the memories. In this manner, any processor may use its own memory to determine the location of a data (as defined by an n-tuple, discussed above) in the storage appliance. This functionality allows any processor to service any I/O request in regards to the location of the data within the storage module. Further, by mirroring the in-memory data structures, the storage appliance may continue to operate when one of the memories fails.

Those skilled in the art will appreciate that while FIGS. 2A-2D show control modules connected to a limited number of storage modules, the control module may be connected to any number of storage modules without departing from the invention. Those skilled in the art will appreciate that while FIGS. 2A-2D show various configurations of the storage appliance, the storage appliance may be implemented using other configurations without departing from the invention.

FIG. 3 shows a storage module in accordance with one or more embodiments of the invention. The storage module (320) includes a storage module controller (322), memory (324), and one or more solid state memory modules (330A, 330N). Each of these components is described below.

In one embodiment of the invention, the storage module controller (322) is configured to receive requests to read from and/or write data to one or more control modules. Further, the storage module controller (322) is configured to service the read and write requests using the memory (324) and/or the solid state memory modules (330A, 330N). Though not shown in FIG. 3, the storage module controller (322) may include a DMA engine, where the DMA engine is configured to read data from the memory (324) or from one of the solid state memory modules (330A, 330N) and write a copy of the data to a physical address in client memory (114 in FIG. 1D). Further, the DMA engine may be configured to write data from the memory (324) to one or more of the solid state memory modules. In one embodiment of the invention, the DMA engine is configured to be programmed by the processor (e.g., 208 in FIG. 2A). Those skilled in the art will appreciate that the storage module may include a DMA engine that is external to the storage module controller without departing from the invention.

In one embodiment of the invention, the memory (324) corresponds to any volatile memory including, but not limited to, Dynamic Random-Access Memory (DRAM), Synchronous DRAM, SDR SDRAM, and DDR SDRAM.

In one embodiment of the invention, the memory (324) may be logically or physically partitioned into vaulted memory (326) and cache (328). In one embodiment of the invention, the storage module controller (322) is configured to write out the entire contents of the vaulted memory (326) to one or more of the solid state memory modules (330A, 330N) in the event of notification of a power failure (or another event in which the storage module may lose power) in the storage module. In one embodiment of the invention, the storage module controller (322) is configured to write the entire contents of the vaulted memory (326) to one or more of the solid state memory modules (330A, 330N) between the time of the notification of the power failure and the actual loss of power to the storage module. In contrast, the content of the cache (328) is lost in the event of a power failure (or another event in which the storage module may lose power).

In one embodiment of the invention, the solid state memory modules correspond to any data storage device that uses solid-state memory to store persistent data. In one embodiment of the invention, solid-state memory may include, but is not limited to, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to storage class memory.

In one embodiment of the invention, the following storage locations are part of a unified address space: (i) the portion of the client memory accessible via the client switch, (ii) the memory in the control module, (iii) the memory in the storage modules, and (iv) the solid state memory modules. Accordingly, from the perspective of the processor in the storage appliance, the aforementioned storage locations (while physically separate) appear as a single pool of physical addresses. Said another way, the processor may issue read and/or write requests for data stored at any of the physical addresses in the unified address space. The aforementioned storage locations may be referred to as storage fabric that is accessible using the unified address space.

In one embodiment of the invention, a unified address space is created, in part, by the non-transparent bridge in the client switch which allows the processor in the control module to "see" a portion of the client memory. Accordingly, the processor in the control module may perform read and/or write requests in the portion of the client memory that it can "see".

Figure 4A:
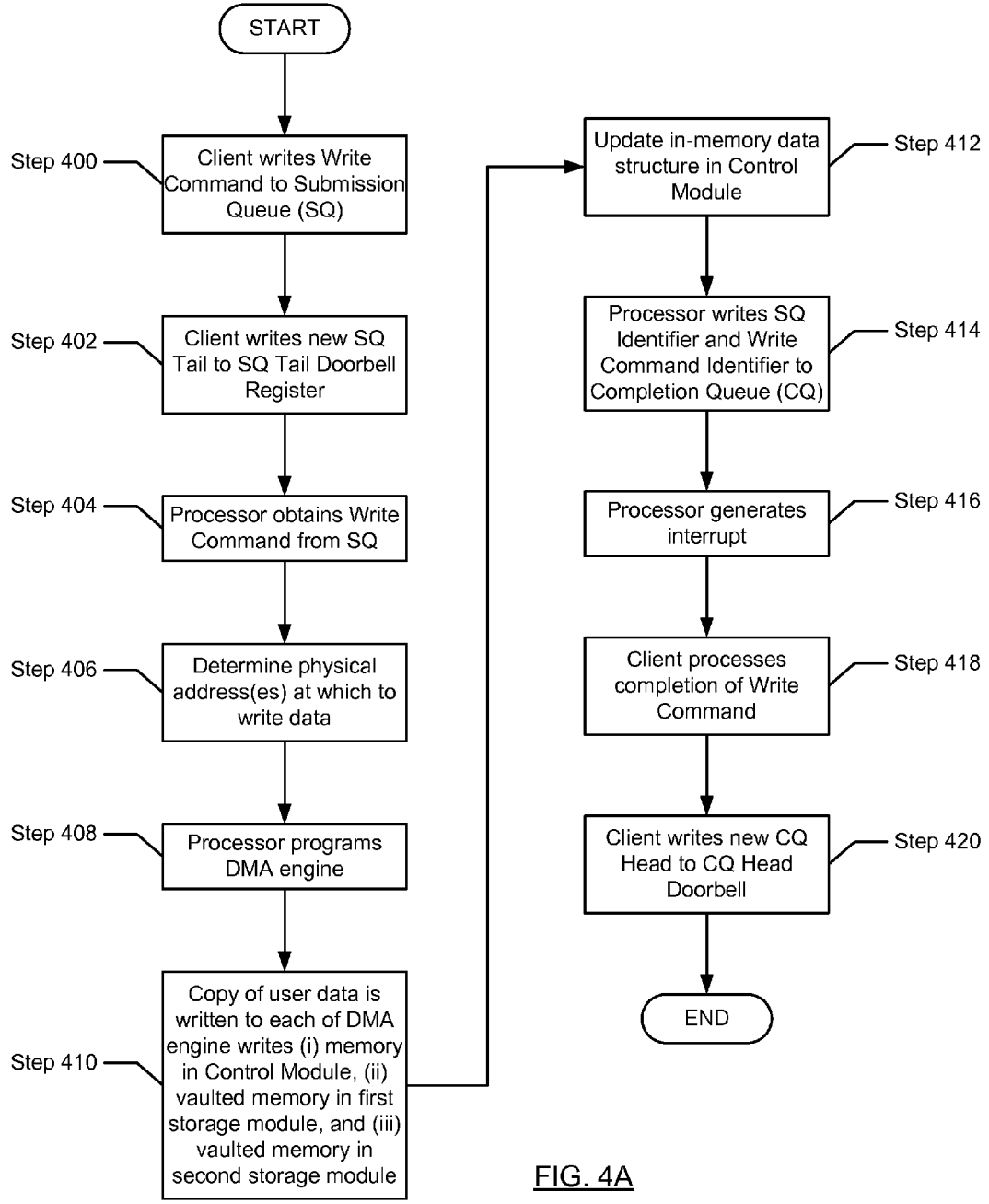
FIGS. 4A-4B show flowcharts in accordance with one or more embodiments of the invention.
Figure 4B:
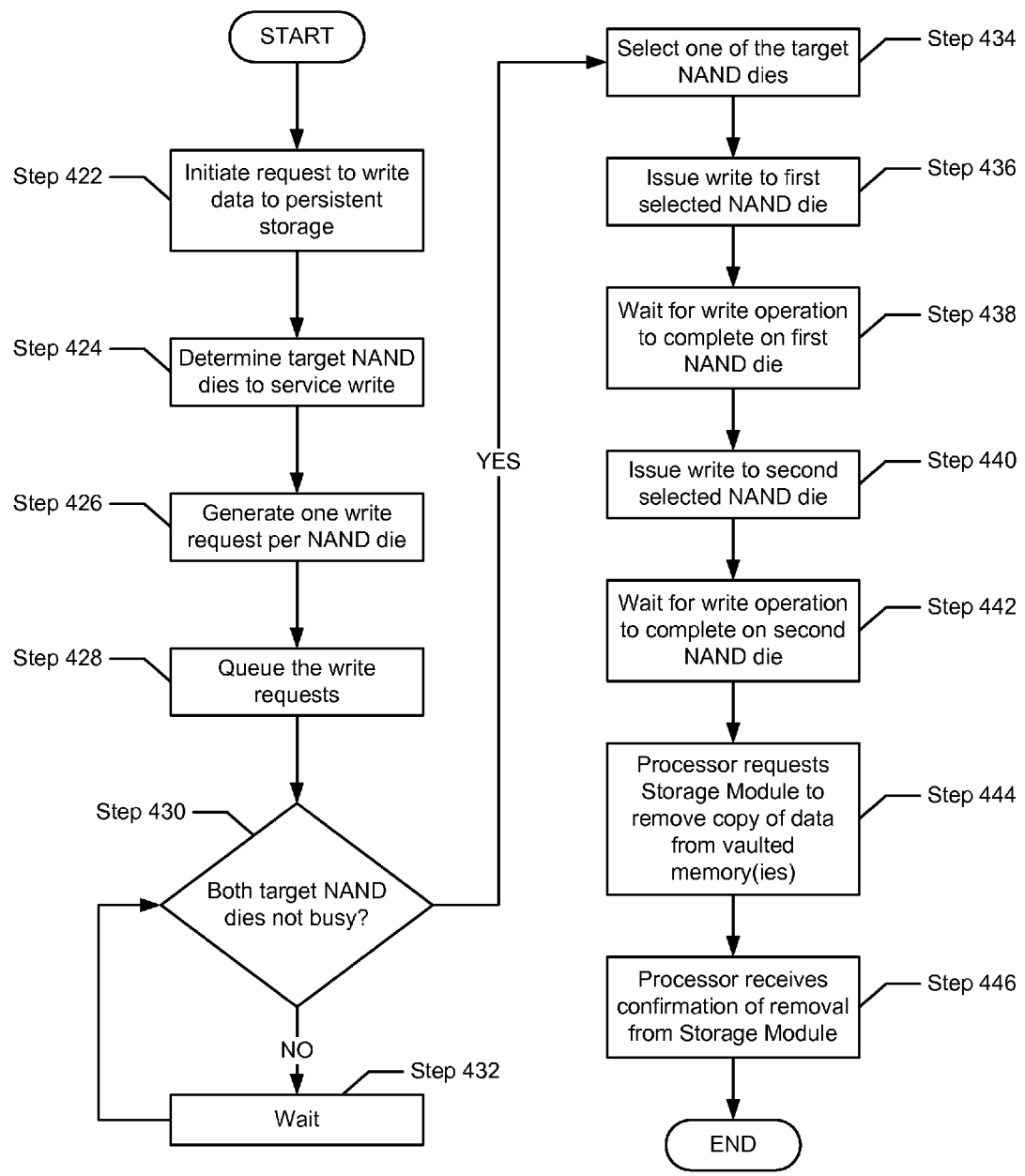

FIGS. 4A-4B show flowcharts in accordance with one or more embodiments of the invention. More specifically, FIGS. 4A-4B show a method for storing data in a storage appliance in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 4A may be performed in parallel with the steps shown in FIG. 4B.

Referring to FIG. 4A, in step 400, the client writes a write command (write request) to the submission queue (SQ) of the processor in a control module (208 in FIG. 2A). In one embodiment of the invention, the write command specifies the logical address (which may also be referred to as a "source address") of the data in the client memory. In one embodiment of the invention, the write command passes through at least the client switch and the switch fabric prior to reaching the SQ.

In step 402, client writes a new SQ tail to the SQ Tail doorbell register. In one embodiment of the invention, by writing to the SQ Tail doorbell register, the client notifies the processor that there is a new command to process in its submission queue.

In step 404, the processor obtains the write command from the SQ. In step 406, the processor determines the physical address(es) in which to write the data. In one embodiment of the invention, the physical address(es) corresponds to a location in the solid state memory module. In one embodiment of the invention, the processor selects two physical addresses in which to write copies of the data, where each of the physical addresses is in a separate solid state memory module.

In step 408, the processor programs the DMA engine to issue a write to a multicast address. In one embodiment of the invention, the multicast address is associated with a multicast group, where the multicast group specifies a first memory location in the memory in the control module, a second memory location in a first vaulted memory, and a third memory location in a second vaulted memory. In one embodiment of the invention, the first vaulted memory is located in the same storage module as the solid state memory module that includes the physical address specified by the processor. In one embodiment of the invention, the second vaulted memory is determined in a similar manner. In one embodiment of the invention, there is one vaulted memory location selected for each physical address identified by the processor in step 406.

In step 410, the DMA engine reads the user data from the source address in client memory, and writes the data to the multicast address as directed by the control module. In one embodiment of the invention, a switch in the switch fabric is associated with the multicast address. Upon receipt of the address, the switch performs the necessary translation on the multicast address to obtain three addresses—one to each of the aforementioned memory locations. The switch subsequently sends copies of the user data to the three memory locations. Those skilled in the art will appreciate that the particular switch which implements the aforementioned multicasting functionality may vary based on the implementation of the switch fabric. In this embodiment, there is only one write issued between the client and the storage appliance.

In another embodiment of the invention, in Step 408, the processor programs the DMA engine to issue three write requests in parallel—one to each of the aforementioned memory locations. In this embodiment, in Step 410, DMA engine issues the three write requests in parallel. In this embodiment, there are three writes issued between the client and the storage appliance.

Continuing with FIG. 4A, in step 412, the processor updates the in-memory data structure to reflect that three copies of the data are stored in the storage appliance. In step 414, the processor writes the SQ Identifier (which identifies the SQ of the processor) and a Write Command Identifier (which identifies the particular write command the client issued to the processor) to the completion queue (CQ) of the client.

In step 416, the processor generates an interrupt for the client processor. In one embodiment of the invention, the processor uses the doorbell interrupts provided by the non-transparent bridge to issue an interrupt to the client processor. In step 418, the client processes the data in its CQ. At this stage, the client has been notified that the write request has been serviced. In step 420, once the client has processed the data at the head of the completion queue, the client writes a new CQ head to the CQ head doorbell. This signifies to the processor, the next location in the CQ to use in future notifications to the client.

Referring to FIG. 4B, at some later point in time, in Step 422, the processor in the control module initiates to write the data from the vaulted storage into the persistent storage (e.g., onto NAND die). In Step 424, a determination is made about which NAND dies (referred to as "target NAND dies") will service the write request in Step 422. More specifically, in one embodiment of the invention, if the data in the persistent storage is mirrored (i.e., there are two copies of each datum in the persistent storage), then in step 424 two target NAND dies in which the data is to be written are identified. In Step 426, the processor generates one write request for each of the target NAND dies identified in step 424.

In Step 428, the write requests are queued by the processor. In one embodiment of the invention, the write requests are queued in a per-NAND die write queue located in the memory in the control module. Those skilled in the art will appreciate that the processor may maintain other data structures for this managing write requests without departing from the invention. In Step 430, a determination is made about whether both of the target NAND dies are not busy (i.e., the target NAND dies are not currently servicing read, write or erase requests). If the both of the target NAND dies are busy the process proceeds to Step 432; otherwise the process proceeds to Step 434.

In Step 432, the write requests queued in Step 428 are not processed. Said another way, the processor waits a predetermined amount of time before returning to Step 430. In Step 434, one of the target NAND dies is selected (i.e., one of the target NAND dies identified in Step 424). In Step 436, the processor issues the write request to the first selected target NAND die (i.e., the target NAND die selected in step 434). In Step 438, the processor waits for the write request issued in Step 436 to complete on the first selected target NAND die. In one embodiment of the invention, the write request is determined to be complete when the first selected NAND die is available to service at least one of a read request, a write request, and an erase request.

In Step 440, the processor issues the write request to the other target NAND die (i.e., the target NAND die not selected in step 434). In Step 442, the processor waits for the write request issued in Step 436 to complete on the first selected target NAND die. In one embodiment of the invention, the write request is determined to be complete when the selected NAND die is available to service at least one of a read request, a write request, and an erase request.

At some later point in time after step 442, steps 444-446 may be performed. In step 444, the processor in the control module requests that all copies of the data in vaulted memory that correspond to the data written to the solid state memory module in steps 438 and 442 are removed. In step 466, a confirmation of the removal is sent to the processor in the control module by each of the storage modules that included a copy of the data (written in steps 438 and 442) in their respective vaulted memories.

Those skilled in the art will appreciate that when the persistent storage stores data using mirroring that the process described in FIG. 4B guarantees that there will always be at least one copy of any given piece of data that can be read immediately or almost immediately from the persistent storage. More specifically, at any given time, at most only one side of the mirror is servicing a write request (or erase request) and, as such, the data can be read from the other side of the mirror.

Further, those skilled in the art will appreciate that the process shown in FIG. 4B may be extended to any other replication scheme (e.g., RAID 0, RAID 2-6). In such implementations, steps 426-442 may be modified to account for the fact that more than two NAND dies are required to service the write request initiated in Step 422. For example, if the persistent storage implements RAID 4, then there are five target NAND dies (four NAND dies that include data and one NAND die that includes parity). In such cases five sequential write requests need to be issued, where at any given time only one of the five target NAND dies is servicing a write request. Accordingly, while one of the write requests is being processed, the remaining four NAND dies may be used to service a read request. In this scenario, four read requests are required to obtain the data and, optionally, the processor needs to use the data obtained from the four read requests to reconstruct the data required to service the read request. Said another way, if the four read requests return three pieces of datum and parity data, then the processor can regenerate the fourth datum using the parity data and the there other datum.

Further, those skilled in the art will appreciate that if the persistent storage implements a RAID scheme (e.g., RAID 0, RAID 2-6), then processor may use the in-memory data structure to track the location of data on each of the NAND dies. Further, the processor may use the in-memory data structure to ensure that prior to issuing a write request to a target NAND die, that all data on the target NAND die may be obtained (or otherwise reconstructed) using other NAND dies in the persistent storage while the target NAND die is servicing the write request.

Those skilled in the art appreciate while the read bandwidth for the persistent storage is unchanged when implementing the process shown in FIG. 4B, the write bandwidth is decreased by half (or more depending on what type of RAID scheme is being implemented). While the write bandwidth is decreased, the read latency is guaranteed thereby allowing latency sensitive clients to use the storage appliance.

FIGS. 5A-5D show an example of storing data in a storage appliance in accordance with one or more embodiments of the invention. The example is not intended to limit the scope of the invention. Further, various components in the client and storage appliance have been omitted for purposes of clarity in FIGS. 5A-5D.

Figure 5A:
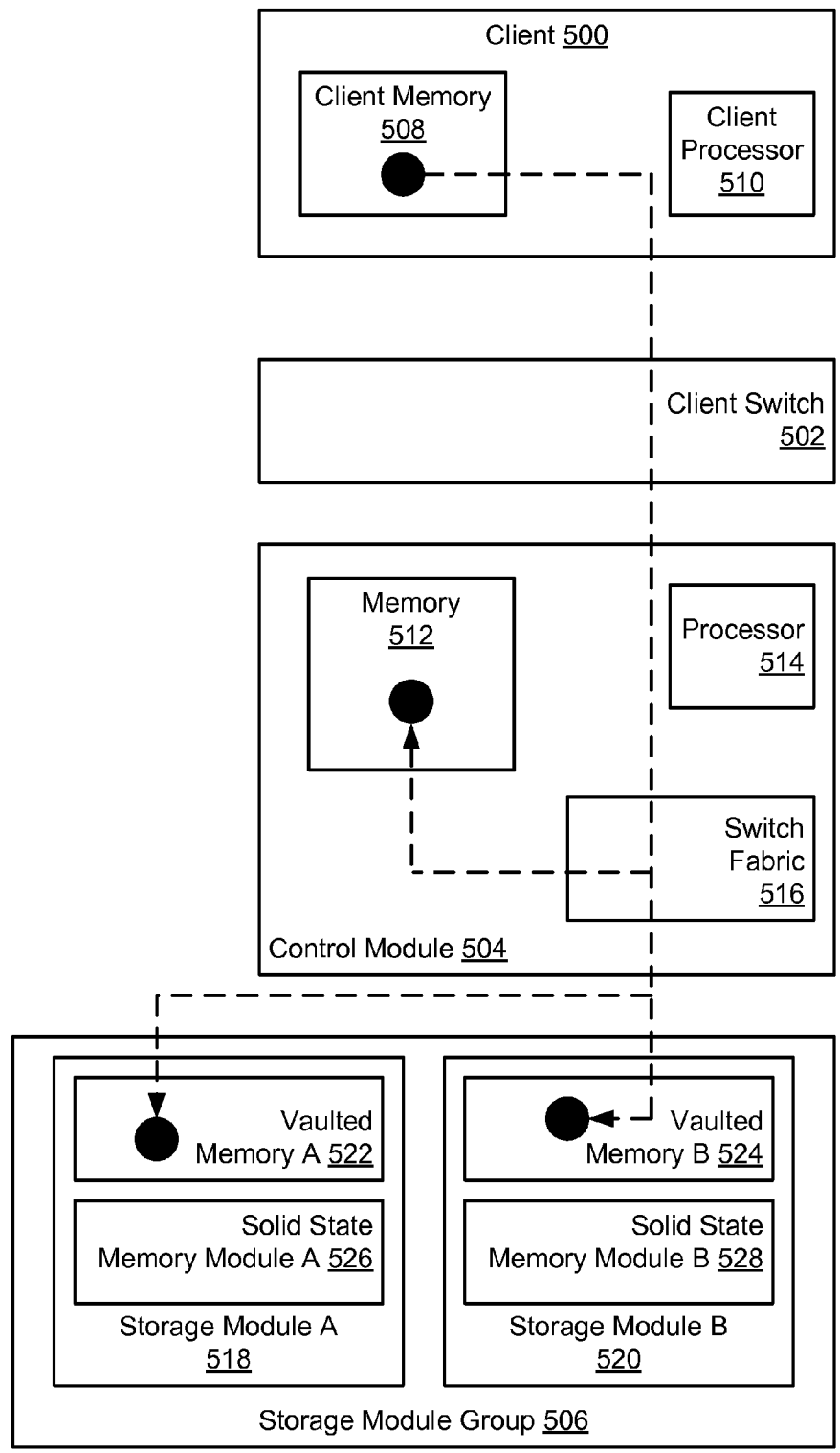
FIGS. 5A-5D show examples in accordance with one or more embodiments of the invention.

Turning to FIG. 5A, consider the scenario in which the client (500) issues a request to write data (denoted by the black circle) to the storage appliance. In response to the request, the processor (514) in the control module (504) determines that a first copy of the data should be written to a first physical location in solid state memory module A (526) in storage module A (518) and that a second copy of the data should be written to a second physical location in solid state memory module B (528) in storage module B (520).

Based on this determination, the processor (514) creates a multicast group with three members. A first member has a destination address in vaulted memory A (522), the second member has a destination address in vaulted memory B (524), and the third member has a destination address in memory (512). The processor (514) subsequently programs the switch (not shown) in the switch fabric (516) to implement the multicast group.

The DMA engine proceeds to issue a write to a multicast address associated with the multicast group. The write is transmitted to the switch fabric and ultimately reaches the switch (not shown) that implements the multicast group. The switch subsequently creates three writes (each to one destination specified by the multicast group) and issues the writes to the target memory locations. In one embodiment of the invention, the three writes occur in parallel.

The copies of the data to be written at the various destination addresses pass through the switch fabric (516). Once the writes are complete, there are three copies of the data in the storage appliance. Further, the in-memory data structure (not shown) in the memory (512) is updated to reflect that the data is stored in three locations within the storage appliance. Finally, the client (500) is notified that the write is complete.

Figure 5B:
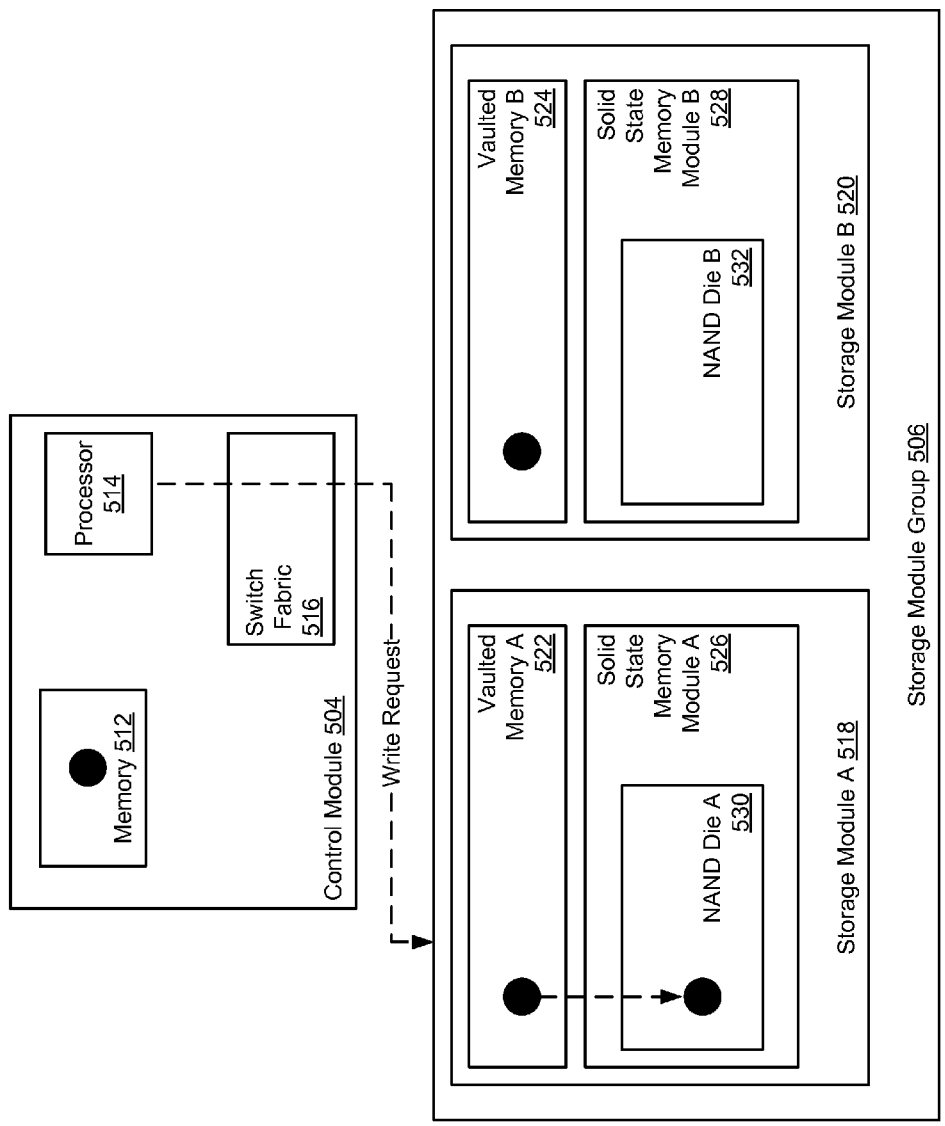

For purposes of this example, assume that NAND die A (530) and NAND die B (532) are mirrors of each other. Referring to FIG. 5B, at some later point in time, the processor (514) initiates the writing of two copies of the data to the storage module group (506). More specifically, the processor determines that one copy of the data is to be written to NAND die A (530) and a second copy of the data is to be written to NAND die B (532).

The processor (514) subsequently determines that both target NAND dies (530, 532) are not busy. Based on this determination, the processor (514) issues a write request to storage module A (518). In response, storage module A (518) writes a copy of the data from vaulted memory A (522) to NAND die A (530).

Figure 5C:
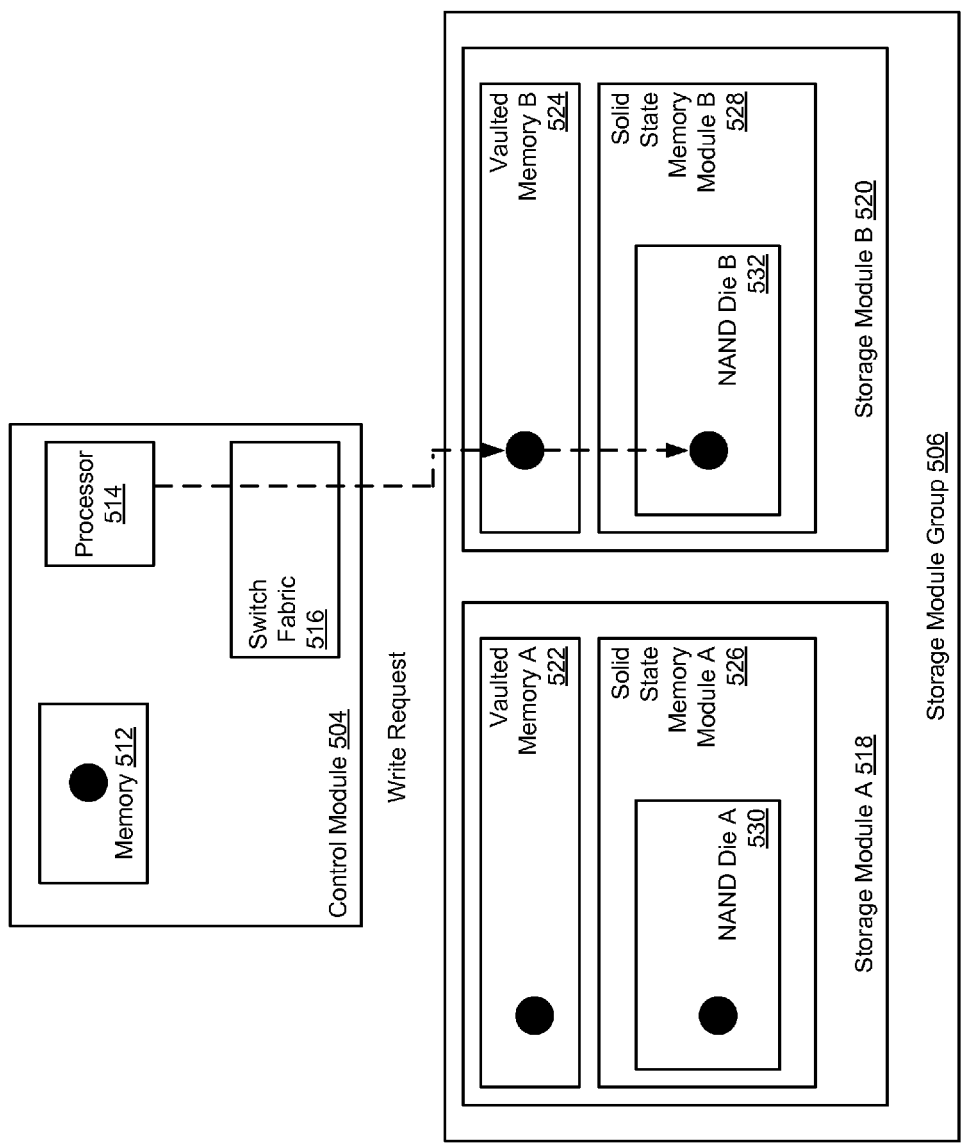

Referring to FIG. 5C, the processor (514) subsequently determines the write request to NAND die A (530) is complete. In one embodiment of the invention, the processor (514) may query storage module A (518) to determine whether the write request is complete. Alternatively, storage module A (518) may notify the processor (514) once the write request is complete. Based on this determination, the processor (514) issues a write request to storage module B (520). In response, storage module B (520) writes a copy of the data from vaulted memory B (524) to NAND die B (530).

Figure 5D:
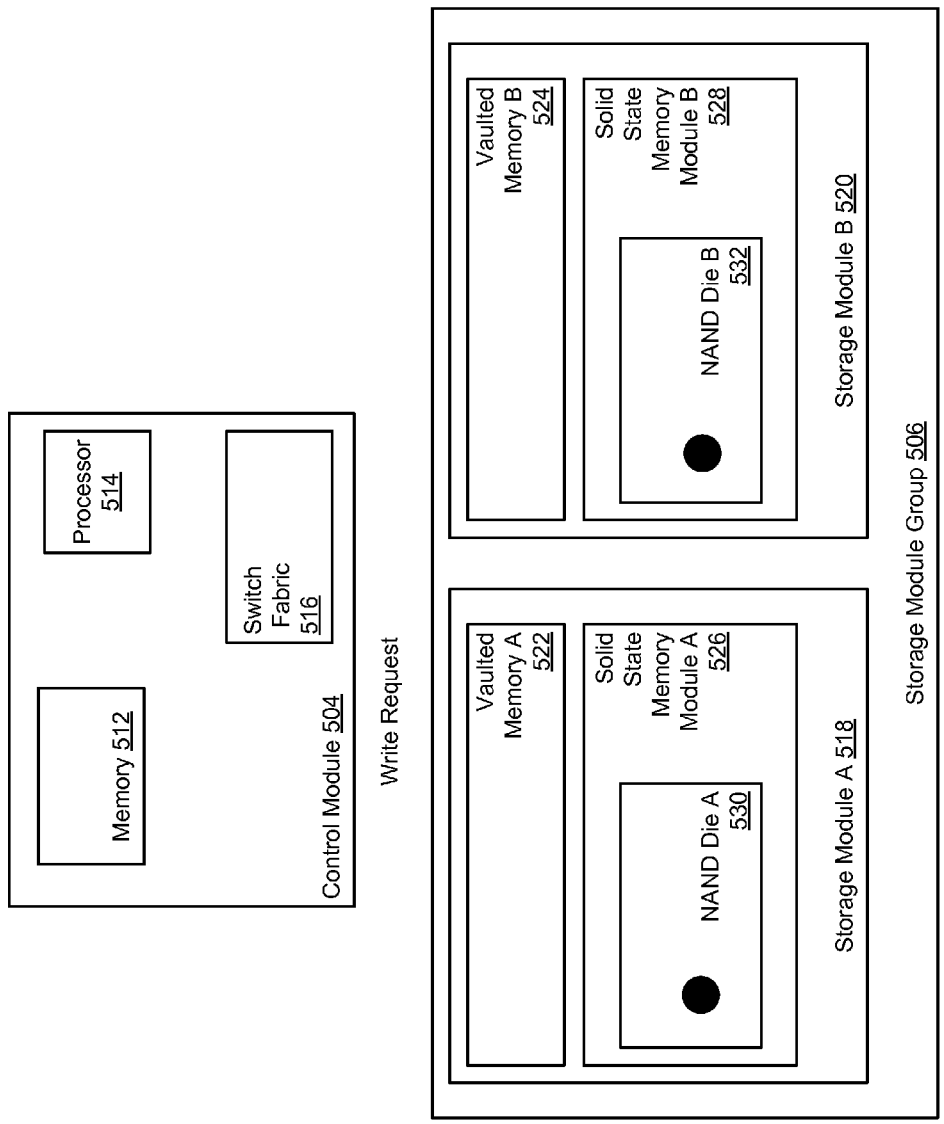

Referring to FIG. 5D, the two write requests are complete, the processor (514) issues a request to all storage modules that include a copy of the data in vaulted memory to remove the copy of the data from their respective vaulted memories. The storage modules each notify the control module upon completion of this request. FIG. 5D shows the state of the system after all storage modules have completed this request. The processor (514) may update the in-memory data structure upon receipt of the notification from the storage modules that all copies of the data in vaulted memory have been removed.

FIGS. 6A-6D shows examples of reading data from a storage appliance in accordance with one or more embodiments of the invention. The example is not intended to limit the scope of the invention. Further, various components in the system have been omitted for purposes of clarity in FIGS. 6A-6D.

Figure 6A:
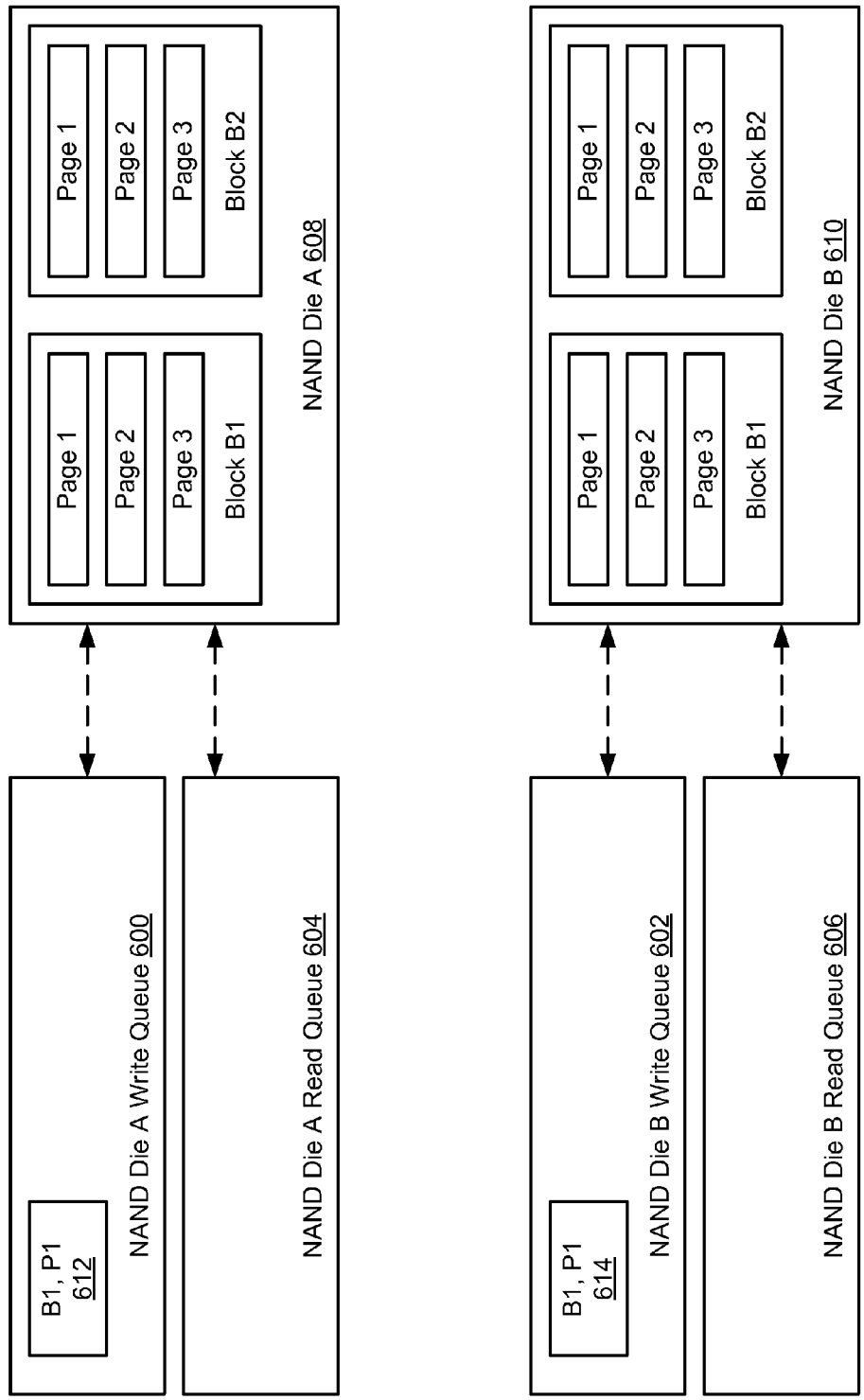
FIGS. 6A-6D show examples in accordance with one or more embodiments of the invention.

Referring to FIG. 6A, consider the scenario in which NAND die A (608) and NAND die B (610) are mirrors of each other. Further, assume that a processor (not shown) determines that one copy of the data is to be written to NAND die A (608) and a second copy of the data is to be written to NAND die B (610).

Figure 6B:
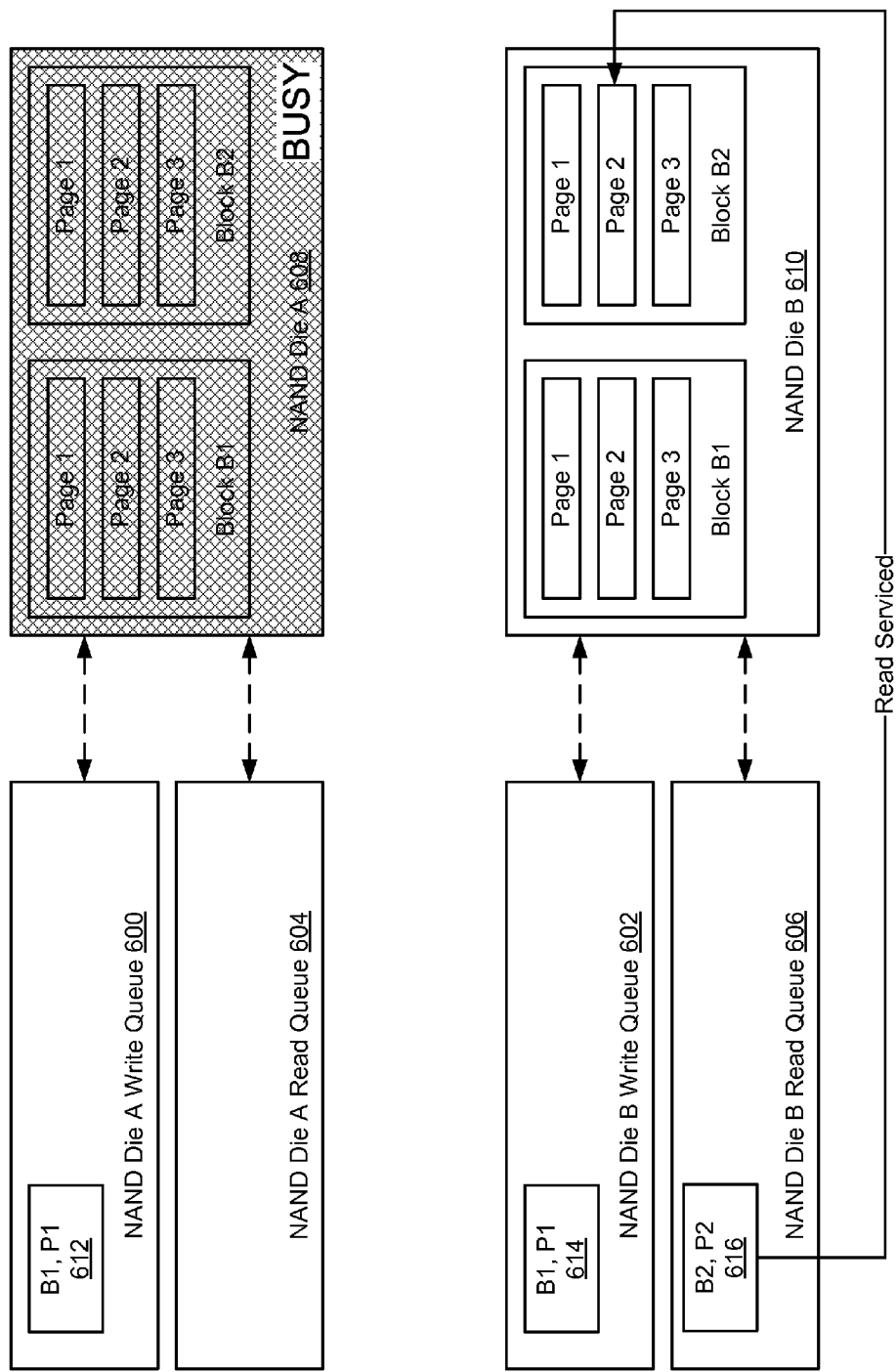

Referring to FIG. 6B, the processor (not shown) determines that NAND die A (608) is busy. Accordingly, the processor waits (e.g., per step 432). However, NAND die B (610) may process a read request (616).

Figure 6C:
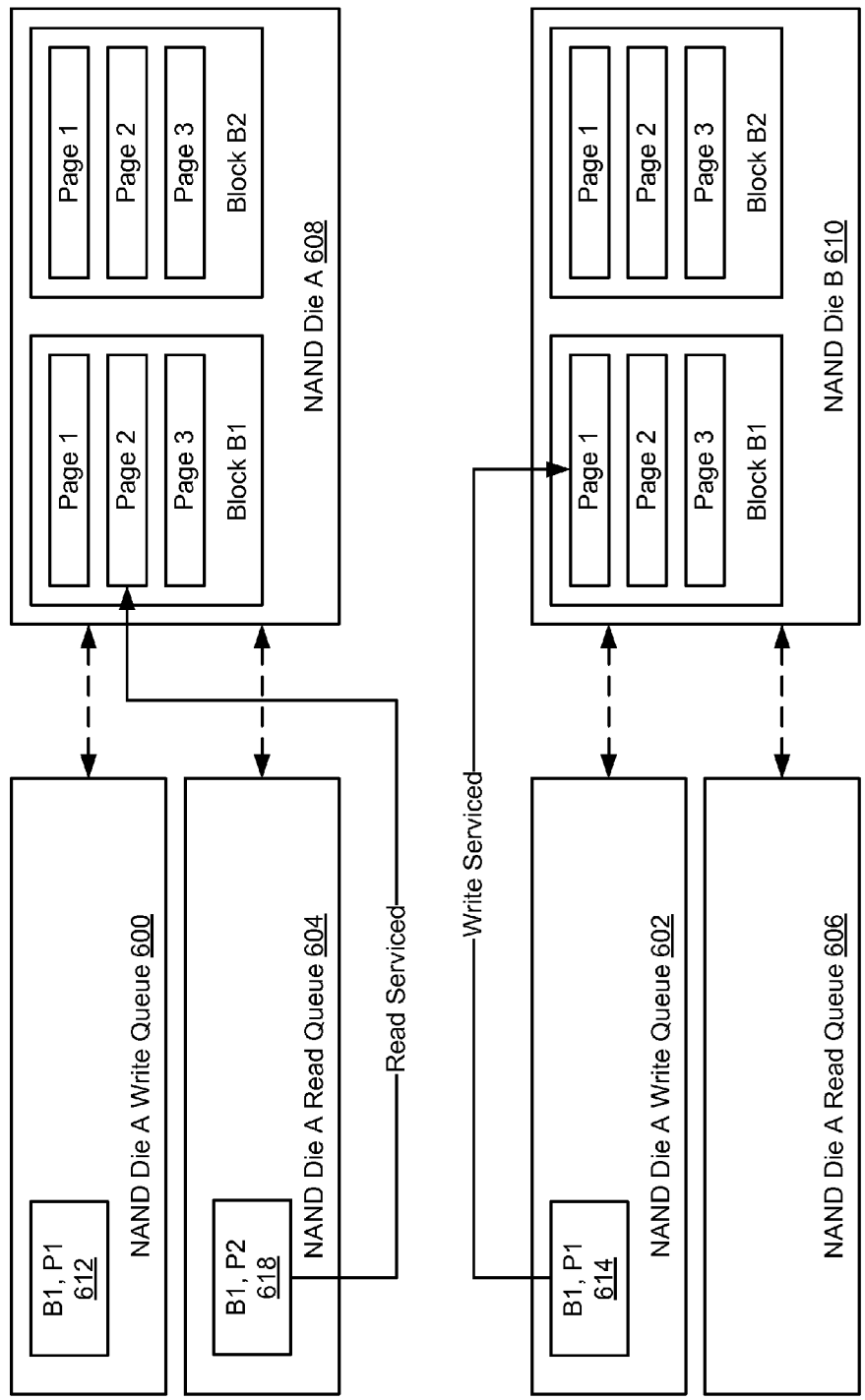

Referring to FIG. 6C, at some later point in time, the processor (not shown) determines that both NAND dies (608, 610) are not busy. Based on this determination, the processor selects NAND die B (610) and issues the write request (614) to NAND die B (610). While the aforementioned write request is being serviced by NAND die B (610), the processor services a read request (618) using NAND die A (608). As discussed above, because NAND die A (608) and NAND die B (610) are mirrored, the read request (618) could have been serviced by either of the NAND dies (608, 610); however, NAND die A (608) was selected because NAND die B (610) was busy servicing the write request (616). Those skilled in the art will appreciate that if both write requests (614, 616) had been issued in parallel, then both NAND dies (608, 610) would be busy at the same time resulting in an increased latency to process the read request (618) (i.e., the read request could only be processed after at least one of the write requests (612, 614) was completed).

Figure 6D:
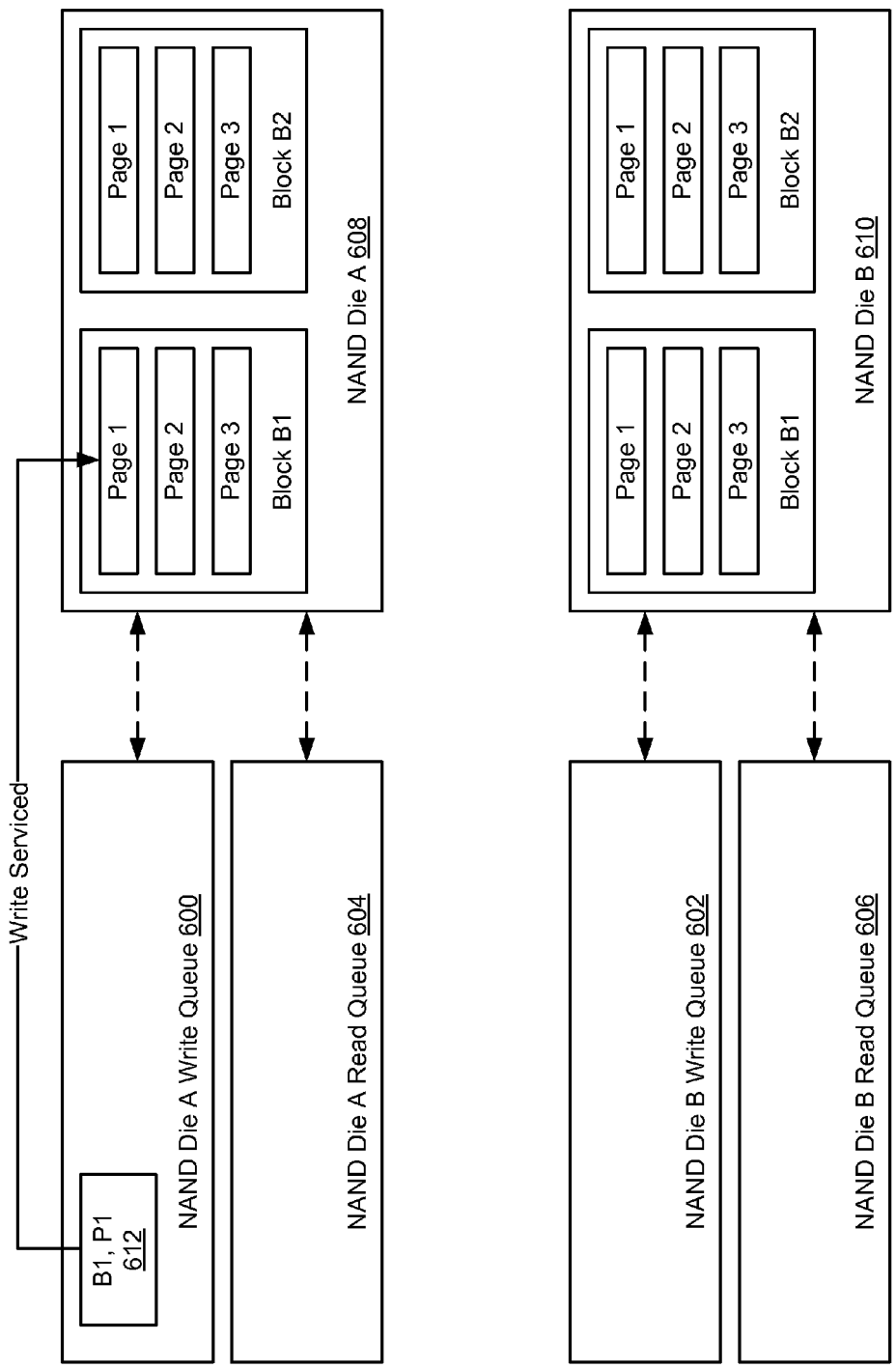

Referring to FIG. 6D, once the write request (614) is completed on NAND die B (610), the processor may issue the write request (612) to NAND die A (608). While NAND die A (608) is servicing the write request (612), read requests for data that is stored on NAND die A (608) may be serviced using copies of the data located on NAND die B (610).

Figure 7:
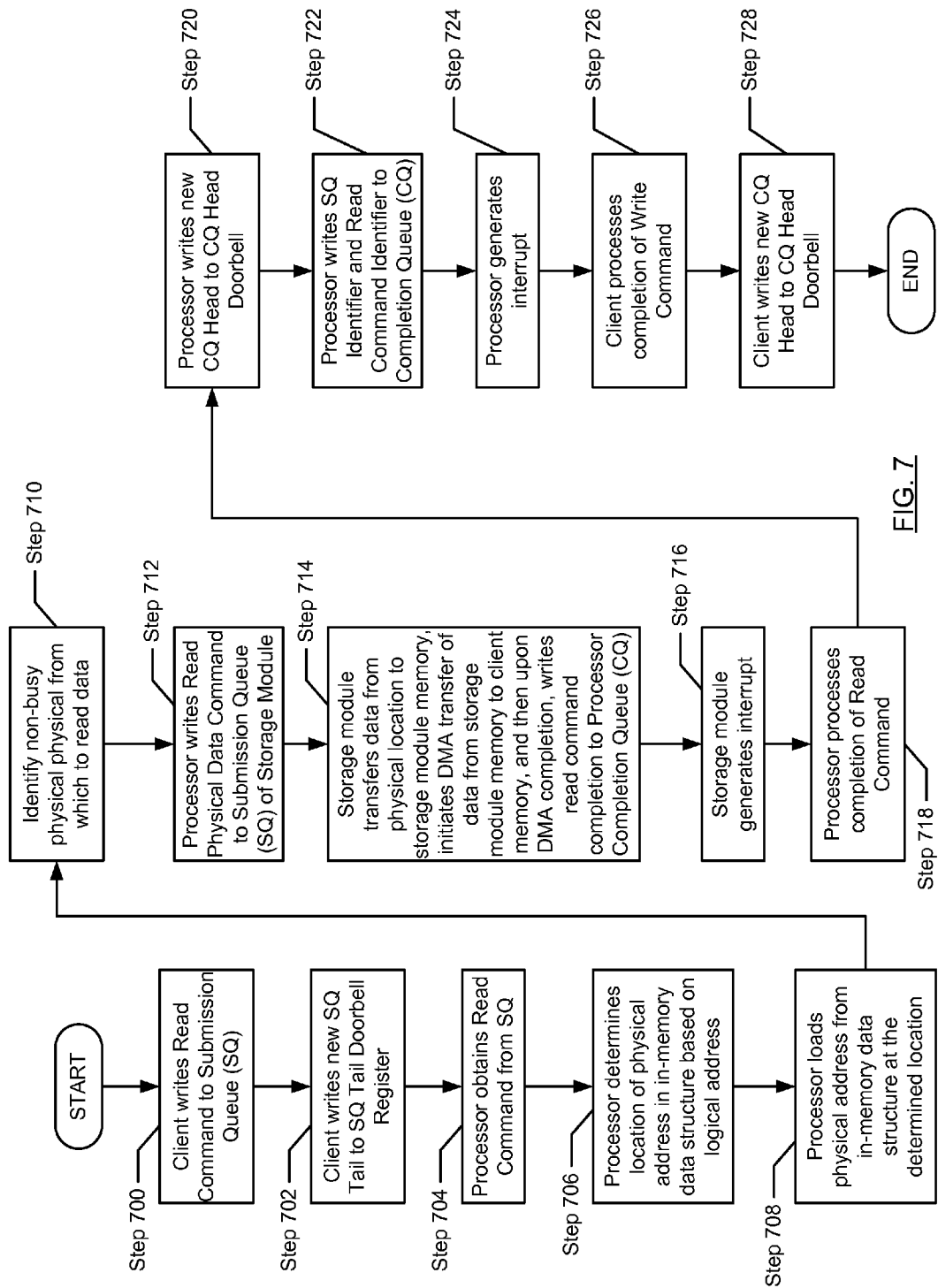
FIG. 7 shows a flowchart in accordance with one or more embodiments of the invention.

FIG. 7 shows a flowchart in accordance with one or more embodiments of the invention. More specifically, FIG. 7 shows a method for reading data from a storage appliance in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In step 700, the client writes a Read Command (read request) to the submission queue (SQ) of the processor in the control module. In one embodiment of the invention, the read command includes a logical address. As discussed above, the content of the logical address may vary based on the implementation.

In step 702, client writes a new SQ tail to the SQ Tail doorbell register. In one embodiment of the invention, by writing to the SQ Tail doorbell register, the client notifies the processor that there is a new command to process in its submission queue. In step 704, the processor obtains the read command from the SQ. In step 706, the processor determines a location(s) of physical address(es) in in-memory data structure based on logical address.

In step 708, the processor obtains the physical address(es) from the location(s) determined in step 706. In one embodiment of the invention, the physical address corresponds to one or more locations of the data in the storage appliance. For example, the data locations may include one or more of the following: a location in the memory of the processor, a location in memory in a storage module, and/or a location in a solid state memory module.

In an alternate embodiment of the invention, if the in-memory data structure includes a direct mapping of logical address(es) to physical address(es), then steps 706 and 708 may be combined to a single look-up in which the logical address is used to directly obtain the physical address(es).

In step 710, non-busy physical addresses are identified. More specifically, if the requested data is stored at two different physical addresses (i.e., the system is implementing mirroring), then the data must be requested from one of the physical addresses. The selection of the particular physical address is based on whether the NAND die which the physical address references is available to service the request (i.e., whether the NAND die is busy). Based on embodiments described above with respect to FIG. 4B, at least one NAND die will be available to service the read request.

In another embodiment of the invention, the system may be implementing RAID 4 (or other another RAID scheme) in which there is both data and parity data stored in the persistent storage. In such embodiments, step 710 involves determining whether the requested data can be directly retrieved (i.e., the data can be retrieved without requiring reconstruction using parity data) or whether the requested data can be obtained using a combination of data and parity data. The selection of the particular physical addresses is based on whether the NAND die which the physical address references is available to service the request (i.e., whether the NAND die is busy). Based on embodiments described above with respect to FIG. 4B, at least one combination of NAND dies will be available to service the read request.

In step 712, the processor writes a Read Physical Data Command(s) to the Submission Queue (SQ) of the Storage Module based on the physical address(es) identified in Step 710.

In step 714, the storage module transfers data from a physical location in the solid state memory module to the storage module memory (e.g., 324 in FIG. 3), initiates a DMA transfer of data from storage module memory to client memory, and then upon DMA completion, writes a read command completion to processor completion queue (CQ). In one embodiment of the invention, if the requested physical location is in the vaulted memory, then the storage module does not need to transfer data from the physical location in the solid state memory module to the storage module memory.

In one embodiment of the invention, the DMA engine is located in the storage module controller of the storage module in which the data is located. In one embodiment of the invention, the DMA engine is configured to send the copy of the data to the client switch. Upon receipt by the client switch, the client switch performs the necessary mapping (or translation) in order to identify the appropriate location in the client memory. The copy of the data is subsequently written to the identified location in the client memory. Those skilled in the art will appreciate that step 714 may be performed multiple times (and in parallel) for each of the physical addresses identified in Step 710.

In step 716, the storage module generates an interrupt for the processor. In step 718, the processor processes the data in its CQ. At this stage, the processor has been notified that the read request has been serviced. In step 720, once the processor has processed the data at the head of the completion queue, the client writes a new CQ head to the CQ head doorbell. This signifies to the storage module the next location in the CQ to use in future notifications to the processor. The process then proceeds to step 722.

In step 722, the processor writes the SQ Identifier (which identifies the SQ of the processor) and a Read Command Identifier (which identifies the particular read command the client issued to the processor) to the completion queue (CQ) of the client. In step 724, the processor generates an interrupt for the client processor. In one embodiment of the invention, the processor uses the doorbell interrupts provided by the non-transparent bridge to issue an interrupt to the client processor. In step 726, the client processes the data in its CQ. At this stage, the client has been notified that the read request has been serviced. In step 728, once the client has processed the data at the head of the completion queue, the client writes a new CQ head to the CQ head doorbell. This signifies to the processor the next location in the CQ to use in future notifications to the client.

One or more embodiments of the invention addresses the potentially large variances in read latency in storage appliances that include persistent storage, where the time required to service a read request is faster relative to the time required to service a write request or an erase request. Embodiments of the invention allow clients to experience a relatively low guaranteed read latency when using storage appliances that have asymmetric read and write/erase latencies.

Further, software instructions in the form of computer readable program code to perform embodiments of the invention may be stored, temporarily or permanently, on a non-transitory computer readable storage medium, such as a random access memory (RAM), flash memory, compact disc (CD), a diskette, a tape, memory, or any other tangible computer readable storage device. Such computer readable program code may be executed by one or more processors to perform various embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for writing data to persistent storage, comprising:
 receiving a first request to write a first datum to persistent storage, wherein the persistent storage comprises a plurality of NAND dies;
 in response to the first request:
  identifying a first NAND die in which to write a first copy of the first datum;
  identifying a second NAND die in which to write a second copy of the first datum;
  generating a second request to write the first copy of the first datum to the first NAND die;
  generating a third request to write the second copy of the first datum to the second NAND die;
  waiting until the first NAND die and second NAND die not are busy;
  based on a determination that the first NAND die and the second NAND die are not busy:
   issuing the second request to the first NAND die; and
   issuing the third request to the second NAND die after the second request is complete.

2. The method of claim 1, further comprising:
 receiving a fourth request to read a second datum;
 determining that a first copy of the second datum is located on the first NAND die and a second copy of the second datum is located on the second NAND die; and
 after the second request is issued to the first NAND die and while the first NAND die is servicing the second request, servicing the fourth request using the second NAND die.

3. The method of claim 1, wherein data in the first NAND die is mirrored in the second NAND die.

4. The method of claim 1, wherein a third copy of the first datum is stored in memory, wherein the memory is in a storage module, wherein the storage module comprises a solid state memory module (SSMM), wherein the SSMM comprises the first NAND die, and wherein the first copy of the first datum is obtained using the third copy of the first datum.

5. The method of claim 4, wherein the third copy of the first datum is removed from the memory after the second request is complete.

6. The method of claim 4, wherein the memory comprises vaulted memory, and wherein the third copy of the first datum is stored in vaulted memory, wherein contents of the vaulted memory are automatically written to the SSMM in the event of a power failure in the storage module.

7. A system, comprising:
 a control module comprising:
  an Input/Output module (IOM);
  a processor;
  a first memory connected to the processor;
  a switch fabric, wherein the IOM and the processor are connected to the switch fabric;
 a first storage module connected to the control module using the switch fabric and comprising:
  a second memory;
  a first persistent storage;
 a second storage module connected to the control module using the switch fabric and comprising:
  a third memory;
  a second persistent storage;
 wherein the control module is configured to:
  receive, from the control module, a first request to write a first datum to persistent storage, wherein the persistent storage comprises the first persistent storage and the second persistent storage;
  in response to the first request:
   identify a first NAND die in which to write a first copy of the first datum, wherein the first NAND die is located in the first persistent storage;
   identify a second NAND die in which to write a second copy of the first datum, wherein the first NAND die is located in the first persistent storage;
   generate a second request to write the first copy of the first datum to the first NAND die;
   generate a third request to write the second copy of the first datum to the second NAND die;
   waiting until the first NAND die and second NAND die are not busy;
   based on the determination that the first NAND die and the second NAND die are not busy:
    issue the second request to the first NAND die; and
    issue the third request to the second NAND die after the second request is complete.

8. The system of claim 7, wherein the control module is further configured to:
 receive a fourth request to read a second datum;
 determine that a first copy of the second datum is located on the first NAND die and a second copy of the second datum is located on the second NAND die; and
 after the second request is issued to the first NAND die and while the first NAND die is servicing the second request, servicing the fourth request using the second NAND die.

9. The system of claim 8, wherein the first memory comprises a data structure mapping the first copy of the second datum to a first physical address in the first persistent storage, wherein the control module is configured to use the data structuring to determine that the first copy of the second datum is located on the first NAND die.

10. The system of claim 7, wherein after serving the second request, the first copy of the first datum is stored in the first NAND die at a first physical address, wherein the first physical address comprises a block ID and a page ID, wherein after serving the third request, the second copy of the first datum is stored in the second NAND die at a second physical address, wherein the second physical address comprises the block ID and the page ID.

11. The system of claim 7, wherein a third copy of the first datum is stored in the second memory prior to receiving the first request, wherein the first copy of the first datum is obtained using the third copy of the first datum.

12. The system of claim 11, wherein the second memory comprises vaulted memory, wherein the third copy of the first datum is stored in vaulted memory, and wherein contents of the vaulted memory are automatically written to the first persistent storage in the event of a power failure in the first storage module.

13. The system of claim 7, wherein the switch fabric implements Peripheral Component Interconnect Express (PCIe) protocol.

14. The system of claim 7, wherein the first storage module further comprises a storage module controller, wherein the storage module controller is configured to write the first copy of the first datum to the first NAND die.

15. The system of claim 14, wherein the storage controller is configured to communicate with the processor using Peripheral Component Interconnect Express (PCIe) protocol.

16. The system of claim 7, wherein the first NAND die is associated with a first write queue and the second NAND die is associated with a second write queue, wherein the second request is stored in the first write queue and the third request is stored in the second write queue.

17. The system of claim 16, wherein the second NAND die is associated with a read queue, and wherein the fourth request is stored in the read queue.

18. The system of claim 16, wherein the first write queue and the second write queue are located in the first memory.

19. A method for reading data comprising:
receiving a request to read the data, wherein the request comprises a logical address;
determining a plurality of physical addresses based on the logical address, wherein a first physical address of the plurality of physical addresses comprises a first datum, wherein a second physical address of the plurality of physical addresses comprises a second datum, wherein a third physical address of the plurality of physical addresses comprises parity datum;
identifying the first physical address and the second physical address, wherein the first physical address corresponds to a location on a first NAND die, the second physical address corresponds to a location on a second NAND die, the third physical address corresponds to a location on a third NAND die, wherein the first NAND die and the third NAND die are not busy and the second NAND die is busy;
obtaining the first datum from the first NAND die and the parity datum from the third NAND die;
reconstructing the second datum from the first datum and the parity datum;
combining the first datum and the second datum to obtain the data; and
returning the data to the client.

20. The method of claim 19, wherein the first NAND die is located in a storage module, wherein the storage module comprises a storage module controller, and wherein obtaining the first datum comprises: sending a Read Physical Data command comprising the first physical address to the storage module controller, wherein the first datum is transferred from the storage module directly to a client memory.

* * * * *